(12) United States Patent
Jin et al.

(10) Patent No.: US 12,550,051 B2
(45) Date of Patent: Feb. 10, 2026

(54) ELECTRONIC DEVICE TRANSMITTING PAIRING SUPPORT SIGNAL AND METHOD OPERATING THE SAME

(71) Applicant: SAMSUNG ELECTRONICS CO., LTD., Suwon-si (KR)

(72) Inventors: Juyeon Jin, Suwon-si (KR); Gupil Cheong, Suwon-si (KR); Doosuk Kang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 692 days.

(21) Appl. No.: 17/890,430

(22) Filed: Aug. 18, 2022

(65) Prior Publication Data

US 2023/0097491 A1 Mar. 30, 2023

Related U.S. Application Data

(63) Continuation of application No. PCT/KR2022/010638, filed on Jul. 20, 2022.

(30) Foreign Application Priority Data

Sep. 27, 2021 (KR) .................. 10-2021-0127270

(51) Int. Cl.
| | |
|---|---|
| *H04W 48/16* | (2009.01) |
| *H04W 76/14* | (2018.01) |
| *H04W 76/15* | (2018.01) |

(52) U.S. Cl.
CPC ........... *H04W 48/16* (2013.01); *H04W 76/14* (2018.02); *H04W 76/15* (2018.02)

(58) Field of Classification Search
CPC ..... H04W 48/16; H04W 8/005; H04W 76/14; H04W 76/15
See application file for complete search history.

(56) References Cited

U.S. PATENT DOCUMENTS

| | | | |
|---|---|---|---|
| 2009/0186580 | A1 | 7/2009 | Kim |
| 2013/0316649 | A1 | 11/2013 | Newham |
| 2017/0093079 | A1 | 3/2017 | Wagman et al. |
| 2017/0094396 | A1 | 3/2017 | Chandramohan et al. |

(Continued)

FOREIGN PATENT DOCUMENTS

| | | |
|---|---|---|
| EP | 3505001 A1 | 7/2019 |
| JP | 2017099259 A | 6/2017 |

(Continued)

OTHER PUBLICATIONS

International Search Report with Written Opinion issued in International Application No. PCT/KR2022/010638; International Filing Date Jul. 20, 2022; Date of Mailing Oct. 24, 2022 (11 pages).
Korean Office Action corresponding to Application No. 10-2021-0127270; Dated Sep. 18, 2025.

*Primary Examiner* — Sulaiman Nooristany
(74) *Attorney, Agent, or Firm* — CANTOR COLBURN LLP

(57) ABSTRACT

An electronic device includes an input device, a communication circuit, and a processor operatively connected with the input device and the communication circuit. The processor is configured to receive, through the input device, a user input requesting pairing support for an ear-wearable device, receive an inquiry packet through the communication circuit from an external electronic device by performing an inquiry scan operation in response to the user input, and transmit an inquiry response packet including device information about the ear-wearable device to the external electronic device through the communication circuit in response to the reception of the inquiry packet.

16 Claims, 18 Drawing Sheets

(56) References Cited

U.S. PATENT DOCUMENTS

| | | | |
|---|---|---|---|
| 2017/0094399 A1* | 3/2017 | Chandramohan | A45C 11/24 |
| 2019/0132665 A1 | 5/2019 | Hankey et al. | |
| 2019/0289381 A1 | 9/2019 | Chawan et al. | |
| 2019/0289382 A1 | 9/2019 | Chawan et al. | |
| 2019/0289383 A1 | 9/2019 | Chawan et al. | |
| 2021/0051458 A1 | 2/2021 | Cheong et al. | |
| 2021/0092578 A1 | 3/2021 | Ryu et al. | |
| 2021/0127247 A1 | 4/2021 | Shimada et al. | |
| 2022/0038216 A1 | 2/2022 | Cheong et al. | |
| 2022/0039179 A1* | 2/2022 | Chen | H04R 1/1016 |
| 2022/0070247 A1* | 3/2022 | Wang | G06F 3/165 |
| 2022/0109923 A1* | 4/2022 | Rajasekaran | H04R 1/1008 |
| 2022/0394794 A1* | 12/2022 | Zhang | H04W 28/021 |

FOREIGN PATENT DOCUMENTS

| | | |
|---|---|---|
| JP | 2019220863 A | 12/2019 |
| KR | 20090081136 A | 7/2009 |
| KR | 20150012306 A | 2/2015 |
| KR | 20170039568 A | 4/2017 |
| KR | 20170039570 A | 4/2017 |
| KR | 20200122820 A | 10/2020 |
| KR | 20200144945 A | 12/2020 |
| KR | 20210020648 A | 2/2021 |
| KR | 20210034200 A | 3/2021 |
| KR | 1020210051932 A | 5/2021 |
| KR | 102270566 B1 | 6/2021 |
| KR | 20210101702 A | 8/2021 |

* cited by examiner

ELECTRONIC DEVICE TRANSMITTING PAIRING SUPPORT SIGNAL AND METHOD OPERATING THE SAME

CROSS-REFERENCE TO RELATED APPLICATION(S)

This application is a continuation application, claiming priority under § 365(c), of an International application No. PCT/KR2022/010638, filed on Jul. 20, 2022, which is based on and claims the benefit of a Korean patent application number 10-2021-0127270, filed on Sep. 27, 2021, in the Korean Intellectual Property Office, the disclosure of which is incorporated by reference herein in its entirety.

BACKGROUND

Field

Embodiments of the present disclosure relate to an electronic device transmitting a pairing support signal and a method for operating the same.

Description of Related Art

Bluetooth communication technology is a short-range wireless communication technology that enables electronic devices to be connected to each other for exchanging data or information. Bluetooth communication may be facilitated using Bluetooth legacy (or classic) communication technology or Bluetooth low energy (BLE) communication technology, which utilizes various kinds of topology, such as piconet or scatternet.

Electronic devices offered in the current market often employ Bluetooth communication technology to increase the convenience of data exchange between the electronic device and input/output devices and/or between other remotely located media devices. Audio headphones or a pair of earbuds are traditionally used to output audio locally to user's ears and are widely utilized by a user in combination with an electronic device.

Advances in ear-wearable devices have allowed headphones, earbuds, etc. to perform various functions in addition to outputting audio. For example, an ear-wearable device may include a microphone to input audio and detect a user's voice or vocal commands, thereby transmitting data for the user's voice to an electronic device (e.g., a smartphone).

The ear-wearable device may include a primary earbud (e.g., the right earbud) and a secondary earbud (e.g., the left earbud) that may be connected to an electronic device (e.g., a smart phone). The primary earbud may transmit voice data to the electronic device through connection with the electronic device, and the electronic device may transmit audio data (or audio content) to the primary earbud. The primary earbud may transfer audio data (or audio content) received from the electronic device through wireless communication to the secondary earbud and may output the audio data through the speaker. The secondary earbud may be synchronized with the primary earbud, outputting the audio data transferred from the primary earbud or electronic device through the speaker.

The primary earbud and the secondary earbud (hereinafter referred to as 'earbuds') can be wirelessly connected (typically referred to as "paired") to the electronic device using an established Bluetooth connection to perform the various ear-wearable operations described above. To establish the Bluetooth connection, the earbuds may perform a pairing operation that includes, for example, an inquiry and/or an inquiry scan operation, or a BLE advertising and/or BLE scan operation.

The inquiry operation may refer to an initial operation of a connection in which an inquiry packet is repeatedly transmitted until a response is received from a target device or a time-out occurs. The inquiry scan operation may refer to an operation for monitoring reception of an inquiry packet through a designated physical channel Upon receiving the inquiry packet through the inquiry scan operation, the earbuds may transmit an inquiry response packet including its own information.

The BLE advertising operation may refer to an operation which periodically broadcasts an advertising packet through an advertising physical channel, and the BLE scan may refer to an operation which monitors reception of the advertising packet.

SUMMARY

Since a Bluetooth electronic device, such as earbuds, should perform various operations using limited resources, the Bluetooth electronic device may be configured to set a priority for each operation. When two or more operations need to be simultaneously performed, the priority setting of the Bluetooth electronic device can prioritize one designated operation over another. For example, the Bluetooth electronic device can be set to prioritize processing of a first operation designated with a higher-priority before processing a second operation, or without ever processing the second operation, designated with a lower-priority operation.

For example, when the earbuds are first operated, the primary earbud and the secondary earbud may first perform a pairing operation to establish mutual connection, and the pairing operation for the earbuds to connect to an electronic device may be delayed due to its priority.

Conventional Bluetooth pairing techniques may also experience pairing delays when the earbuds are connected to an electronic device (e.g., a smartphone) because the inquiry scan operation is not performed unless it is initiated by the user. Further, the inquiry scan operation may be stopped from operation while the earbuds are connected with the electronic device to prevent battery and communication security issues and improve scheduling efficiency of the earbuds. Therefore, when the user intends to connect the earbuds with a different external electronic device other than the electronic device (e.g., a smartphone) being currently used, the user is typically required to stop the operation that is currently being performed by the earbuds and allow the earbuds to enter the pairing mode (e.g., inquiry scan mode or BLE advertising scan mode).

As another example, to allow the earbuds to operate in the pairing mode, the user may be required to manually control the earbuds to enter the pairing mode using a specific physical user interface (e.g., a button of the earbuds) with the earbuds placed on the cradle or worn on the user's body. If the earbuds are currently connected with the electronic device, the user is typically required to release the connection (in other words, disconnect) with the currently connected electronic device using a specific physical user interface (e.g., a Bluetooth control application (typically referred to as an "app) installed on the electronic device or a button of the earbuds) and to allow the earbuds enter the pairing mode.

Such conventional methods can hinder use of the earbuds and electronic device because it is requires a new user experience ("UX") to learn and recall several steps in order to successfully pair an ear-wearable device (e.g., earbuds) to one or more electronic devices. In addition, the conventional methods for pairing ear-wearable devices with an electronic device may be confused with other tasks that may seem similar when performed by a user on the same user interface.

According to an embodiment, an electronic device and method is provided that allows an ear-wearable device such as earbuds, for example, to quickly and more conveniently initiate the pairing mode and establish a Bluetooth connection with the electronic device. The electronic device includes an input device, a communication circuit, and at least one processor operatively connected with the input device and the communication circuit. The at least one processor may be configured to perform an inquiry scan operation in response to detecting an inquiry scan event. The inquiry scan event can include, but is not limited to receive, through the input device, a user input requesting pairing support for one or both of a first earbud and a second earbud. The at least one processor may be configured to receive an inquiry packet from the communication circuit and sent by an external electronic device in response to the inquiry scan operation, and transmit an inquiry response packet including device information about one or both of the first earbud and the second earbud to the external electronic device through the communication circuit in response to receiving the inquiry packet.

According to an embodiment, a method for operating an electronic device includes receiving a user input requesting pairing support for one or both of a first earbud and a second earbud, performing an inquiry scan operation in response to the user input and receiving an inquiry packet from an external electronic device in response to performing the inquiry scan operation, and transmitting an inquiry response packet including device information about one or both of the first earbud or the second earbud to the external electronic device in response to receiving the inquiry packet.

A non-transitory computer readable storage medium storing one or more programs, the one or more programs comprising instructions configured to, when executed by at least one processor of an electronic device, cause the electronic device to: receive a user input requesting pairing support for one or both of a first earbud and a second earbud, receive an inquiry packet from an external electronic device by performing an inquiry scan operation in response to the user input, and transmit an inquiry response packet including device information about one or both of the first earbud and the second earbud to the external electronic device in response to receiving the inquiry packet.

According to one embodiment, an electronic device includes an input device, a communication circuit, and at least one processor operatively connected with the input device and the communication circuit. The at least one processor may be configured to receive, through the input device, a user input requesting pairing support for one or both of a first earbud and a second earbud, and to transmit a Bluetooth low energy (BLE) advertising packet through the communication circuit in response to the user input, where the BLE advertising packet may include device information about one or both of the first earbud and the second earbud.

According to one embodiment, a method for operating an electronic device includes receiving a user input requesting pairing support for one or both of a first earbud and a second earbud, and transmitting a Bluetooth low energy (BLE) advertising packet including device information about one or both of the first earbud and the second earbud in response to the user input.

A non-transitory computer readable storage medium storing one or more programs, the one or more programs comprising instructions configured to, when executed by at least one processor of an electronic device, cause the electronic device to: receive a user input requesting pairing support for one or both of a first earbud and a second earbud, and transmit a Bluetooth low energy (BLE) advertising packet including device information about one or both of the first earbud and the second earbud in response to the user input.

DETAILED DESCRIPTION

Figure 1:
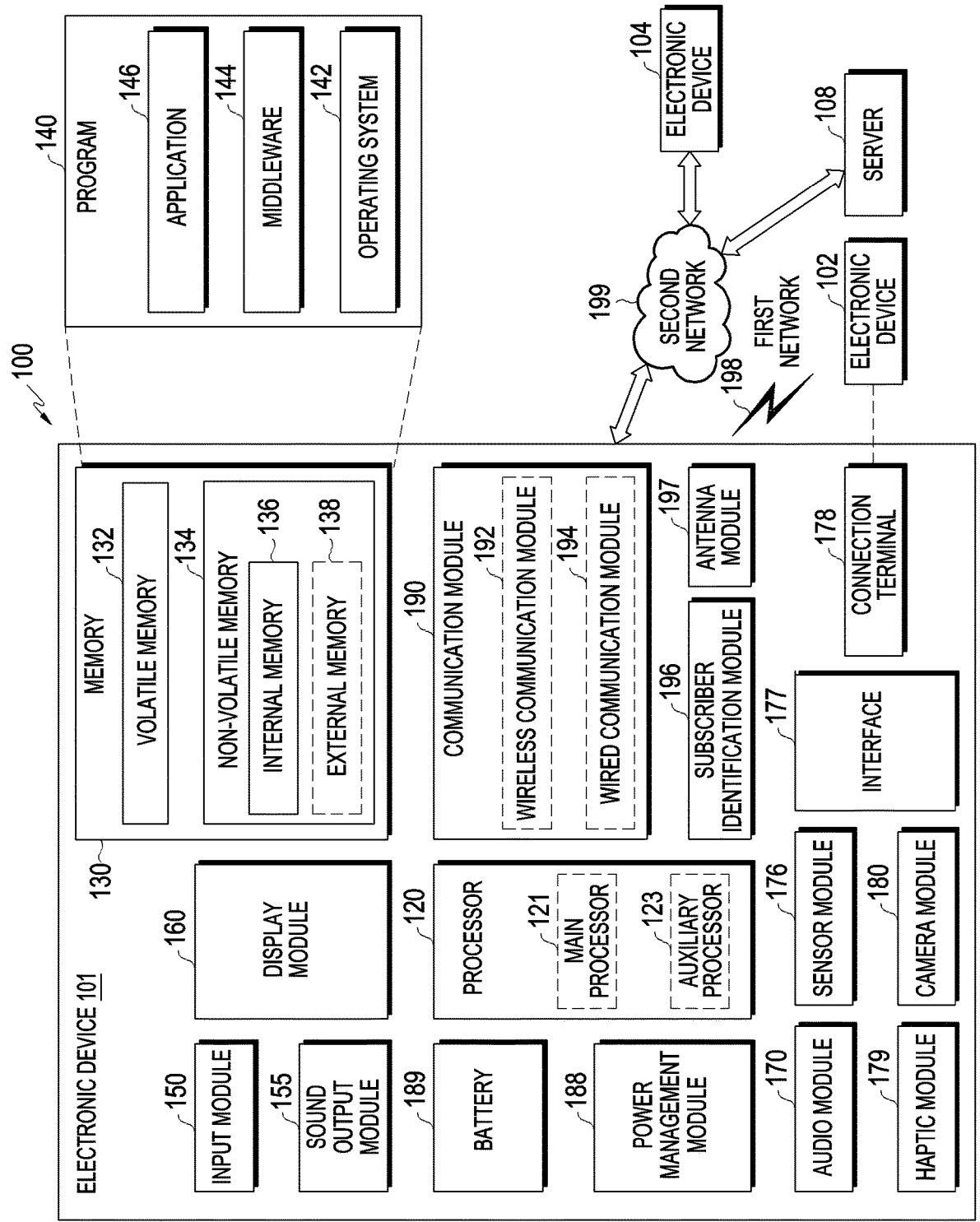
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
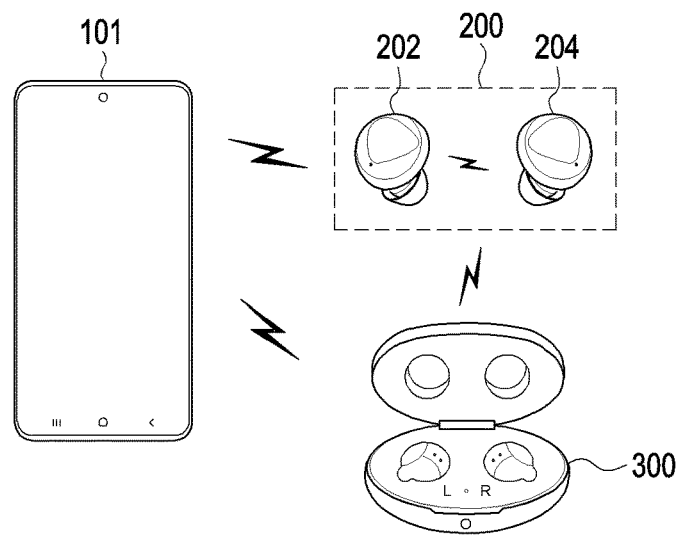
FIG. 2 illustrates an example of connection between a user terminal and a wearable device according to one embodiment.

FIG. 2 illustrates an example of connection between a user terminal (e.g., the electronic device 101) and a wearable device 200 according to one embodiments.

Referring to FIG. 2, the user terminal (e.g., the electronic device 101) may be wirelessly connected to the wearable device 200. The user terminal (e.g., the electronic device 101) may include a smart phone as shown in FIG. 2 but, without limited to those described and/or shown, may be implemented as various types of devices (e.g., notebook computers including standard laptop computers, ultrabooks, netbooks, or tab books, laptop computers, tablet computers, or desktop computers). The user terminal (e.g., the electronic device 101) may be implemented as described above in FIG. 1 and may thus include the components (e.g., various modules) shown in FIG. 1, and no duplicate description thereof is thus given below.

The wearable device 200 may be implemented as an ear-wearable device such as, for example, wireless earbuds as shown in FIG. 2 but, can include other types of ear-wearable devices including, but not limited to, wireless headphones, a wireless headset, etc. The wearable device 200 may also be, without limitation to those described and/or shown, implemented as various types of devices (e.g., a smart watch, a head-mounted display device, or devices for measuring biometric signals (e.g., heartrate patch)) that may have at least one electrode and a sensor device as described below. According to an embodiment, when the wearable device 200 is provided as an ear-wearable device, the wearable device 200 may include an earbud or a pair of devices (e.g., the first earbud 202 and the second earbud 204). According to an embodiment, the pair of devices (e.g., first earbud 202 and second earbud 204) may be implemented to include the same or similar components (e.g., the components described in connection with FIG. 4).

According to one embodiment, the user terminal (e.g., the electronic device 101) and the wearable device 200 may establish a communication connection with each other and transmit and/or receive data to/from each other. For example, the user terminal (e.g., the electronic device 101) and the wearable device 200 each may use D2D communication, such as Wi-Fi direct or Bluetooth, (e.g., using a communication circuit supporting the corresponding communication scheme) to establish a communication connection therebetween but, without limited thereto, may use other various types of communication (e.g., a communication scheme, such as Wi-Fi, using access points (APs), a cellular communication scheme using base stations, or a wired communication scheme).

In an embodiment, when the wearable device 200 includes a wireless earbud or a pair of wireless earbuds, the user terminal (e.g., the electronic device 101) may establish a communication connection with any one device (e.g., the primary earbud) of the pair of devices (e.g., the first earbud 202 or the second earbud 204) but, without limited to those described, establish communication connection with both the pair of devices (e.g., the first earbud 202 and the second earbud 204). In an embodiment, the user terminal (e.g., the electronic device 101) may communicate with one earbud (e.g., the secondary earbud) of the pair of devices (e.g., the first earbud 202 and the second earbud 204) using the other earbud (e.g., the primary earbud).

According to one embodiment, when the wearable device 200 includes wireless earbuds, the pair of devices (e.g., the first earbud 202 and the second earbud 204) may establish a communication connection therebetween and transmit and/or receive data (e.g., audio data and/or control data) therebetween. The communication connection may be established using D2D communication (e.g., using a communication circuit supporting the corresponding communication), such as Wi-Fi direct or Bluetooth, as described above, but is not limited thereto.

In an embodiment, one of the devices included in the pair of devices (e.g., the first earbud 202 and the second earbud 204) may operate as the primary device (or master device or main device), while the other devices operates as the secondary device (or secondary device). The primary device (or main device) may transmit data to the secondary device. For example, when the pair of devices (e.g., the first earbud 202 and the second earbud 204) establishes a communication connection therebetween, one of the pair of devices (e.g., the first earbud 202 and the second earbud 204) may randomly be selected as the primary device, and the other may randomly be selected as the secondary device.

For example, when the pair of devices (e.g., the first earbud 202 and the second earbud 204) establish a communication connection therebetween, the device detected as first worn (e.g., when a value indicating wearing is detected by a wearing detection sensor (e.g., a proximity sensor, a touch sensor, a slope 6-axis sensor, or a 9-axis sensor)) may be selected as the primary device, and the other as the secondary device. In an embodiment, the primary device may transmit the data, received from the user terminal (e.g., the electronic device 101), to the secondary device. For example, the first earbud 202, as the primary device, may output audio through the speaker based on the audio data received from the user terminal (e.g., the electronic device 101) and transmit the audio data to the second earbud 204, as the secondary device. In an embodiment, the secondary device may receive, through sniffing, the audio data transmitted from the user terminal (e.g., the electronic device 101) to the primary device, based on connection information provided from the primary device.

In an embodiment, the first earbud 202, operating as the primary device, may transmit the data (e.g., audio data or control data) received from the second earbud 204, operating as the secondary device, to the user terminal (e.g., the electronic device 101). For example, when a touch event occurs in the second earbud 204 operating as the secondary device, control data including information about the event may be transmitted to the user terminal (e.g., the electronic device 101) by the first earbud 202 operating as the primary device. However, without limited to those described, the secondary device and the user terminal (e.g., the electronic device 101) may establish a communication connection therebetween as described above, so that the secondary device and the user terminal (e.g., the electronic device 101) may directly perform transmission and/or reception of data therebetween.

In an embodiment, the first earbud 202 and the second earbud 204 may be wiredly and/or wirelessly connected with an electronic device 300 having one or more storage spaces sized and shaped to correspond to the first earbud 202 and the second earbud 204. In an embodiment, the electronic device 300 may be an ear-wearable storage and/or protection case. According to an embodiment, the electronic device 300 may be an earbuds case or a cradle device for storing and charging the first earbud 202 and the second earbud 204. In an embodiment, the electronic device 300 may establish a communication connection with the first earbud 202 and the second earbud 204 and transmit and/or receive data to/from the first earbud 202 and the second earbud 204. In an embodiment, the electronic device 300 may establish a communication connection with the user terminal (e.g., the electronic device 101) and transmit and/or receive data to/from the user terminal (e.g., the electronic device 101). For example, the electronic device 300 may transmit, to the user terminal (e.g., the electronic device 101), information about the state (e.g., operating or not operating, battery level, etc.) of the first earbud 202 and the second earbud 204 and/or the state (e.g., cover open or closed, or whether the first earbud 202 and/or second earbud 204 is stored) of the electronic device 300.

Examples of the wearable device 200 is further described below. Hereinafter, for convenience of description, a case in which the wearable device 200 is a pair of earbuds 202 and 204 is described, but the following description may also be applied to various types of wearable devices 200 (e.g., smart watches, head-mounted display devices, or devices for measuring biometric signals).

Figure 3:
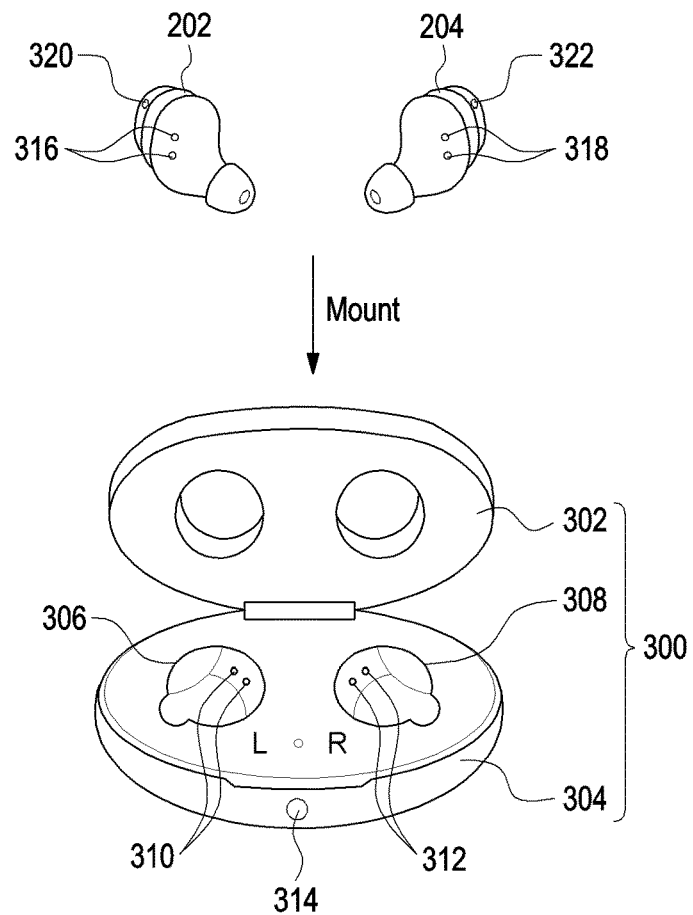
FIG. 3 schematically illustrates a configuration of an electronic device and a pair of earbuds according to one embodiment.

FIG. 3 schematically illustrates a configuration of an electronic device 300 and a pair of earbuds 202 and 204 according to one embodiment.

Referring to FIG. 3, the first earbud 202 and the second earbud 204 may be ear-wearable devices. In an embodiment, when the first earbud 202 and the second earbud 204 are a pair of wireless earphones separate for both ears (e.g., true wireless stereo (TWS)), the first earbud 202 and the second earbud 204 may be connected to each other through short-range wireless communication technology (e.g., Bluetooth legacy, BLE, D2D communication, Wi-Fi direct, etc.). Each of the first earbud 202 and the second earbud 204 may be, e.g., the external electronic device 102 of FIG. 1 or the external electronic device 104 of FIG. 1.

In an embodiment, the first earbud 202 and the second earbud 204, respectively, may include a first electric contact 316 and a second electric contact 318 (e.g., the interface 480 as described below) that are used to connect to the electric contacts (e.g., the electric contacts 310 and 312) of the electronic device (e.g., the electronic device 300) to be charged with power. The first electric contact 316 and the second electric contact 318 may be used to connected to the electric contacts (e.g., the electric contacts 310 and 312) of the electronic device (e.g., the electronic device 300) to be charged with power.

In an embodiment, the first earbud 202 and the second earbud 204, respectively, may include a first sensor 320 and a second sensor 322 (e.g., the sensor module 440 as described below) used to determine whether the cover of the electronic device (e.g., the electronic device 300) is in an open state or a closed state.

In an embodiment, when the first sensor 320 and the second sensor 322 are magnetic sensors (e.g., hall sensors), the first sensor 320 and the second sensor 322 may identify whether the cover of the electronic device (e.g., the electronic device 300) is in the open state or closed state based on whether the strength of the magnetic force detected by the first sensor 320 and/or the second sensor 322 is a threshold or more. The first sensor 320 and/or the second sensor 322 may detect the magnetic force from a magnetic body included in the cover of the electronic device (e.g., the electronic device 300). In an embodiment, when the detected magnetic force is the threshold or more, the cover of the electronic device (e.g., the electronic device 300) may be identified as being in the closed state and, when the detected magnetic force is less than the threshold, the cover of the electronic device (e.g., the electronic device 300) may be identified as being in the open state.

In an embodiment, when the first sensor 320 and the second sensor 322 are light detecting sensors (or illuminance sensors), the first sensor 320 and the second sensor 322 may identify whether the cover of the electronic device (e.g., the electronic device 300) is in the open state or closed state based on whether the amount of light detected by the first sensor 320 and/or the second sensor 322 is a threshold or more. In an embodiment, when the detected amount of light is the threshold or more, the cover of the electronic device (e.g., the electronic device 300) may be identified as being in the open state and, when the detected amount of light is less than the threshold, the cover of the electronic device (e.g., the electronic device 300) may be identified as being in the closed state.

The electronic device 300 may be a case or cradle device used for storing and/or charging one or both of the first earbud 202 and the second earbud 204 and may include a cover 302 and a body 304. The body 304 of the electronic device 300 may include a first mounting unit 306 and a second mounting unit 308 on which the first earbud 202 and the second earbud 204, respectively, may be mounted as shown in FIG. 3.

The first mounting unit 306 and the second mounting unit 308 may include a third electric contact 310 and a fourth electric contact 312, respectively. The third electric contact 310 and the fourth electric contact 312 may be connected, directly or proximately, to the first electric contact 316 of the first earbud 202 and the second electric contact 318 of the second earbud 204. In an embodiment, when the first electric contact 316 of the first earbud 202 comes in contact with the third electric contact 310, the electronic device 300 may determine that the first earbud 202 is mounted on the first mounting unit 306 of the electronic device 300 and, when the first electric contact 316 of the first earbud 202 comes off the third electric contact 310, the electronic device 300 may detect detachment of the first earbud 202 from the first mounting unit 306 of the electronic device 300. Likewise, when the second electric contact 318 of the second earbud 204 comes in contact with the fourth electric contact 312, the electronic device 300 may determine that the second earbud 204 is mounted on the second mounting unit 308 of the electronic device 300 and, when the second electric contact 318 of the second earbud 204 comes off the fourth electric contact 312, the electronic device 300 may detect detachment of the second earbud 204 from the second mounting unit 308 of the electronic device 300.

Although not shown in FIG. 3, the electronic device 300 may include a power supply circuit. For example, the electronic device 300 may provide the power, supplied from the outside through a USB port or a charging cable, or the power of the battery mounted in the electronic device 300 to the first earbud 202 and the second earbud 204 through the third electric contact 310 or the fourth electric contact 312. The first earbud 202 and the second earbud 204 may receive the power, provided from the third electric contact 310 and the fourth electric contact 312, through the first electric contact 316 and the second electric contact 318.

The electronic device 300 may include a sensor (not shown) (e.g., a magnetic sensor) for identifying the open or closed state of the cover 302. The electronic device 300 may identify that the cover 302 is in the open or closed state based on the information identified by the sensor and may provide information indicating that the cover 302 is in the open or closed state to the first earbud 202 or the second earbud 204. The information indicating that the cover 302 is in the open or closed state may be provided to the first earbud 202 or the second earbud 204 based on a request from the first earbud 202 or the second earbud 204.

In an embodiment, the electronic device 300 may communicate with the first earbud 202 and/or the second earbud 204 based on a wired communication scheme using, e.g., local area network (LAN) or a programmable logic controller (PLC), or a wireless communication scheme using Bluetooth legacy or BLE communication technology. In an embodiment, the electronic device 300 may communicate with the user terminal (e.g., the electronic device 101) based on a wireless communication scheme (e.g., Bluetooth legacy or BLE communication technology). Accordingly, the electronic device 300 may include a communication interface for wired communication or wireless communication.

Figure 4:
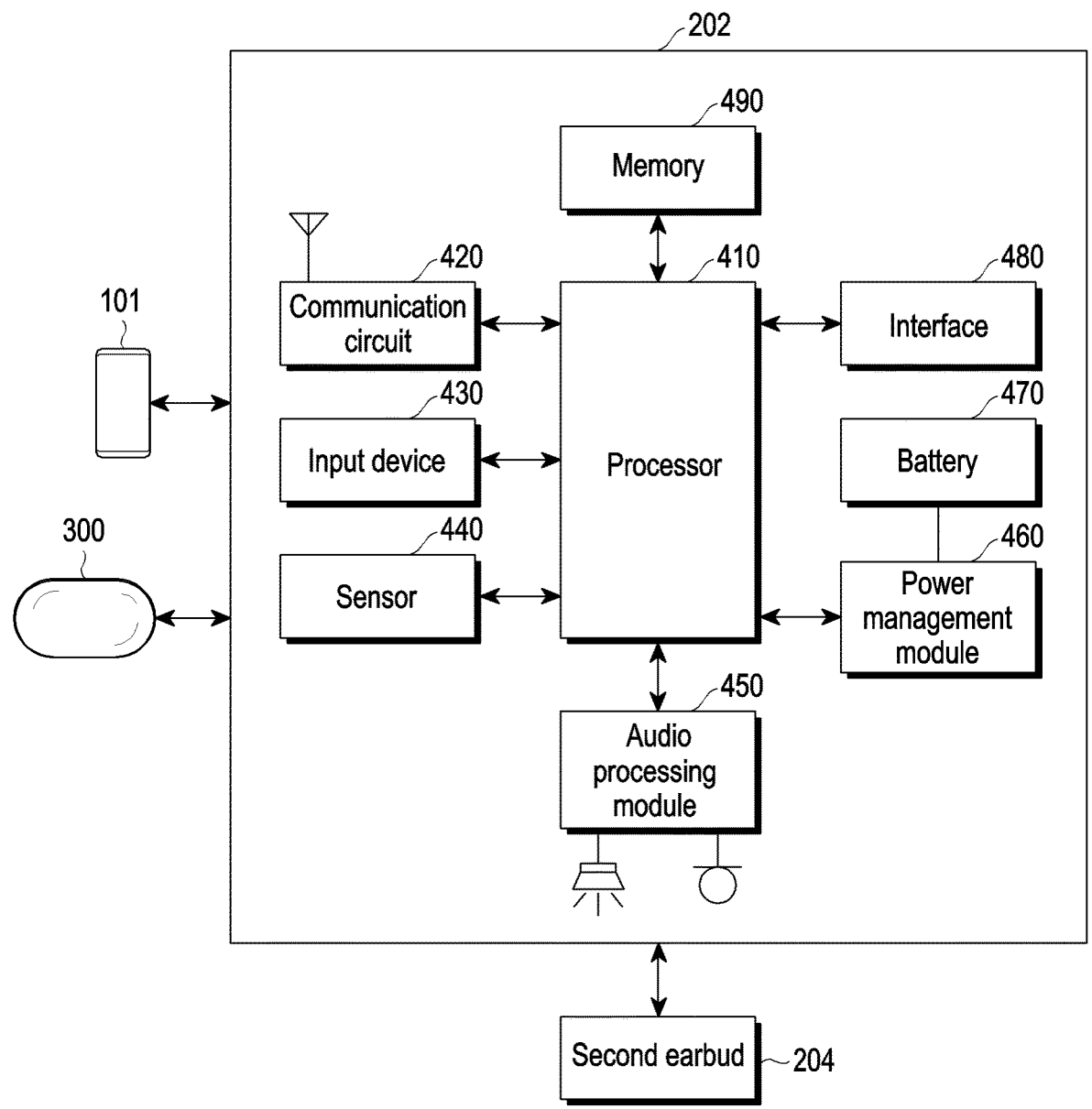
FIG. 4 is a block diagram illustrating a configuration of a first earbud according to one embodiment.

FIG. 4 is a block diagram illustrating a configuration of a first earbud 202 according to one embodiment. In an embodiment, the first earbud 202 may be a primary earbud that may be connected with the electronic device 101 (e.g., a smart phone) shown in FIG. 1, and the second earbud 204 may be a secondary earbud that may be connected to the primary earbud.

The first earbud 202 may include the same or similar components to at least one of the components (e.g., modules) of the electronic device 101 illustrated in FIG. 1. The first earbud 202 may include a communication circuit 420 (e.g., the communication module 190 of FIG. 1), an input device 430 (e.g., the input module 150 of FIG. 1), a sensor 440 (e.g., the sensor module 176 of FIG. 1), an audio processing module 450 (e.g., the audio module 170 of FIG. 1), a memory 490 (e.g., the memory 130 of FIG. 1), a power management module 460 (e.g., the power management module 188 of FIG. 1), a battery 470 (e.g., the battery 189 of FIG. 1), an interface 480 (e.g., the interface 177 of FIG. 1), and a processor 410 (e.g., the processor 120 of FIG. 1). According to an embodiment, the communication circuit 420 may include one or more of a wireless communication module (e.g., a Bluetooth communication module, a cellular communication module, a wireless-fidelity (Wi-Fi) communication module, a near-field communication (NFC) communication module, or a GNSS communication module) or a wired communication module (e.g., a LAN communication module or a power line communication (PLC) communication module).

The communication circuit 420 may directly or indirectly communicate with at least one of the electronic device (e.g., a smartphone), the electronic device 300 (e.g., a charging device, such as a cradle or charging case), or the second earbud 204 (e.g., the secondary earbud) through a first network (e.g., the first network 198 of FIG. 1), using at least one communication module. The second earbud 204 may be a component of the ear-wearable device 200 configured as a pair with the first earbud 202. The communication module 420 may include one or more communication processors that are operable independently from the processor 410 and supports wired or wireless communication.

According to an embodiment, the communication circuit 420 may be connected with one or more antennas for transmitting signals or information to another electronic device (e.g., one or more of the electronic device 101, the electronic device 300, and the second earbud 204) or receiving signals or information from the other electronic device. According to an embodiment, at least one antenna appropriate for a communication scheme used in a communication network, such as the first network (e.g., the first network 198 of FIG. 1) or the second network (e.g., the second network 199 of FIG. 2), may be selected from the plurality of antennas by, e.g., the communication circuit 420. The signal or information may then be transmitted or received between the communication circuit 420 and another electronic device via the selected at least one antenna.

According to an embodiment, the input device 430 may be configured to generate various input signals that may be used for operation of the first earbud 202. The input device 430 may include one or more of a touch pad, a touch panel, or a button. The touch pad may recognize touch inputs in one or more of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key.

According to an embodiment, the input device 430 may generate a user input regarding the turn-on/off of the first earbud 202. According to an embodiment, the input device 430 may receive a user input for a communication connection between the first earbud 202 and the second earbud 204. According to an embodiment, the input device 430 may receive a user input associated with audio data (or audio content). For example, the user input may be associated with functions of starting playback of audio data, pausing playback, stopping playback, adjusting playback speed, adjusting playback volume, or muting. The operation of the first earbud 202 may be controlled by various gestures, such as tapping or swiping up/down the surface on which the touch pad is installed. According to an embodiment, the input device 430 may receive a user input to start pairing between the first earbud 202 and the electronic device 101. For example, in response to the user input, the processor 410 may operate the first earbud 202 in a pairing mode (e.g., an inquiry scan mode or a BLE advertising scan mode).

According to an embodiment, the sensor 440 may identify the position or operational state of the first earbud 202 or identify whether the cover 302 of the electronic device 300 is in the open or closed state. The sensor 440 may convert measured or identified information into an electric signal. The sensor 440 may include one or more of, e.g., a magnetic sensor, an acceleration sensor, a gyro sensor, a geomagnetic sensor, a proximity sensor, a gesture sensor, a grip sensor, or a biometric sensor. In an embodiment, the sensor 440 may further include an optical sensor. The optical sensor may include a light emitting unit (e.g., a light emitting diode (LED)) that outputs light of at least one wavelength band. The optical sensor may include a light receiving unit (e.g., a photodiode) that receives light of one or more wavelength bands scattered or reflected from an object and generates an electrical signal.

According to an embodiment, the audio processing module 450 may support an audio data gathering function and reproduce the gathered audio data. According to an embodiment, the audio processing module 450 may include an audio decoder (not shown) and a D/A converter (not shown). The audio decoder may convert audio data stored in the memory 490 or received from the electronic device 101 through the communication circuit 420 into a digital audio signal. The D/A converter may convert the digital audio signal converted by the audio decoder into an analog audio signal. According to an embodiment, the audio decoder may convert audio data received from the electronic device 101 through the communication circuit 420 and stored in the memory 490 into a digital audio signal. The speaker may output the analog audio signal converted by the D/A converter. According to an embodiment, the audio processing module 450 may include an A/D converter (not shown). The A/D converter may convert the analog audio signal transferred through the microphone into a digital voice signal.

According to an embodiment, the audio processing module 450 may play various audio data set in the operation of the first earbud 202. For example, the processor 410 may be designed to detect insertion or removal of the first earbud 202 into/from the user's ear through the sensor 440 and reproduce audio data regarding an effect sound or guide sound through the audio processing module 450. The output of the sound effect or guide sound may be omitted according to the user setting or the designer's intention.

According to an embodiment, the memory 490 may store various data used by at least one component (e.g., the processor 410 or the sensor 440) of the first earbud 202. The various data may include, for example, software and input data or output data for a command related thereto. According to an embodiment, the data may include the audio data received from the electronic device 101, cover state (e.g., open or closed state) information about the electronic device 300, position information about the second earbud 204 received from the electronic device 300 or the second earbud 204, or role information necessary for connection with the second earbud 204, and information about at least one parameter. The memory 490 may include a volatile memory or a non-volatile memory.

According to an embodiment, the power management module 460 may manage power supplied to the first earbud 202. According to one embodiment, the power management module 460 may be implemented as at least part of, for example, a PMIC. According to an embodiment, the power management module 460 may include a battery charging module. According to an embodiment, if another electronic device (e.g., one of the electronic device 101, the electronic device 300, the second earbud 204, or another electronic device) is electrically connected with the first earbud 202 (wirelessly or wiredly), the power management module 460 may receive power from the other electronic device to charge the battery 470.

According to an embodiment, the battery 470 may supply power to at least one component of the first earbud 202. According to an embodiment, the battery 470 may include, e.g., a rechargeable battery. According to an embodiment, if the first earbud 202 is mounted in the electronic device 300, the first earbud 202 may charge the battery 470 to a previously designated charge level and then power on the first earbud 202 or turn on at least part of the communication circuit 310.

According to an embodiment, the interface 480 may support one or more designated protocols that may be used for the first earbud 202 to directly (e.g., wiredly) connect to the electronic device 101, the electronic device 300, the second earbud 204, or another electronic device. According to an embodiment, the interface 480 may include one or more of, e.g., an HDMI, a USB interface, an SD card interface, a PLC interface, or an audio interface. According to an embodiment, the interface 480 may include at least one connection port (e.g., the connection ports 316 and 318) for establishing a physical connection with the electronic device 300.

According to an embodiment, the processor 410 may execute, e.g., software to control at least one other component (e.g., a hardware or software component) of the first earbud 202 connected with the processor 410 and may process or compute various data. According to an embodiment, as at least part of the data processing or computation, the processor 410 may load a command or data received from another component (e.g., the sensor 440 or communication circuit 420) onto a volatile memory 490, process the command or the data stored in the volatile memory 490, and store resulting data in a non-volatile memory.

According to an embodiment, the processor 410 may identify whether an electrical connection is established between the first earbud 202 and the electronic device 300 through the sensor 440 or the interface 480. When an electrical connection is established between the first earbud 202 and the electronic device 300, the processor 410 may receive position information about the second earbud 204 from the electronic device 300.

According to an embodiment, the processor 410 may recognize the magnetic body installed in the electronic device 300 through the magnetic sensor included in the sensor 440, thereby identifying whether the cover 302 of the electronic device 300 is in the open or closed state.

According to an embodiment, the processor 410 may recognize that the connection port (e.g., the electric contact 316) included in the interface 480 contacts the third electric contact 310 or fourth electric contact 312, thereby identifying whether an electrical connection is established between the first earbud 202 and the electronic device 300.

According to an embodiment, the processor 410 may establish a communication connection with the electronic device 101 through the communication circuit 420 and receive data (e.g., audio data) from the electronic device 101 through the communication connection. According to an embodiment, the processor 410 may transmit the data, received from the electronic device 101 through the communication circuit 420, to the second earbud 204.

According to an embodiment, the processor 410 may perform the operations of the first earbud 202 which are to be described below.

According to an embodiment, the first earbud 202 may further include various modules depending on the form in which it is provided. There are many variations according to the convergence trend of digital devices, so it is not possible to list them all, but components equivalent to the above-mentioned components may be further included in the first earbud 202. Further, it is apparent that in the first earbud 202 according to an embodiment, specific components may be excluded from the above components or replaced with other components according to the form in which it is provided. This will be easily understood by those of ordinary skill in the art.

According to an embodiment, the second earbud 204 configured to pair with the first earbud 202 may include the same or similar components to those included in the first earbud 202 and may perform all or some of the operations of the first earbud 202 described below in connection with the drawings.

Figure 5:
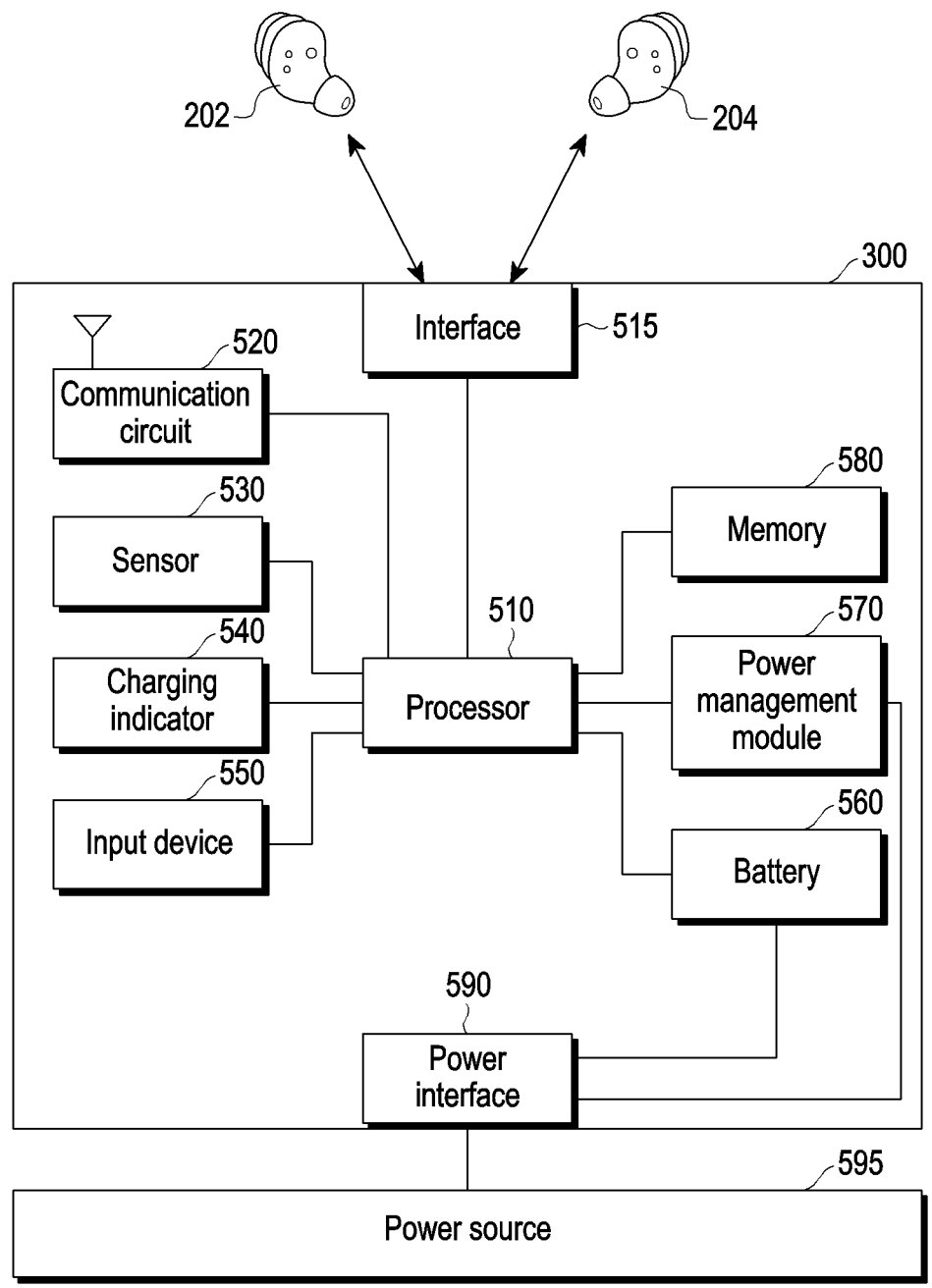
FIG. 5 is a block diagram illustrating an electronic device capable of storing a first earbud and a second earbud according to one embodiment.

FIG. 5 is a block diagram illustrating an electronic device 300 capable of storing a first earbud 202 and a second earbud 204 according to one embodiment.

According to an embodiment, the electronic device 300 may be a cradle device configured to store the first earbud 202 and the second earbud 204. The electronic device 300 may include a processor 510, a communication circuit 520, a sensor 530, at least one charging indicator 540, an input device 550, an interface 515, a power interface 590, a memory 580, a power management module 570, and a battery 560.

The processor 510 may execute, e.g., software to control at least one other component (e.g., a hardware or software component) of the electronic device 300 connected with the processor 510 and may process or compute various data. According to an embodiment, as at least part of the data processing or computation, the processor 510 may load a command or data received from another component (e.g., the sensor 530 or communication circuit 520) onto a volatile memory 580, process the command or the data stored in the volatile memory 580, and store resulting data in a non-volatile memory.

The communication circuit 520 may include one or more of a wireless communication module (e.g., a cellular communication module, a Wi-Fi communication module, a Bluetooth communication module, an NFC communication module, or a GNSS communication module) or a wired communication module (e.g., a LAN communication module or a power line communication module). A corresponding communication module among these communication modules may communicate with one or more of an electronic device (e.g., the electronic device 101 (e.g., a user terminal), and earbuds 202 and 204 through a first network (e.g., the first network 198 of FIG. 1) and/or a second network (e.g., the second network 199 of FIG. 1). The communication circuit 520 may include one or more communication processors that are operable independently from the processor 510 and supports a direct (e.g., wired) communication or a wireless communication.

According to an embodiment, the communication circuit 520 may be connected with one or more antennas for transmitting signals or power to another electronic device (e.g., the electronic device 101 or the earbuds 202 and 204) or receiving signals or power from the other electronic device. According to an embodiment, at least one antenna appropriate for a communication scheme used in a communication network, such as the first network (e.g., the first network 198 of FIG. 1) or the second network (e.g., the second network 199 of FIG. 2), may be selected from the plurality of antennas by, e.g., the communication circuit 520. The signal or the power may then be transmitted or received between the communication circuit 520 and another electronic device via the selected at least one antenna.

In an embodiment, the communication circuit 520 may be connected to the electronic device 101 and/or the earbuds 202 and 204 using a wireless communication scheme, such as Bluetooth or Wi-Fi, and may transmit/receive signals or data to/from the electronic device 101 or may transmit/receive signals or data to/from the earbuds 202 and 204.

According to an embodiment, the sensor 530 may measure a physical quantity or detect an operational state of the electronic device 300. The sensor 530 may convert measured or detected information into an electric signal. The sensor 530 may include one or more of, e.g., an acceleration sensor, a gyro sensor, a geomagnetic sensor, a proximity sensor, a gesture sensor, a grip sensor, an optical sensor, or a biometric sensor. According to an embodiment, the sensor 530 may detect whether one or more of the earbuds 202 and 204 are mounted in the electronic device 300.

According to an embodiment, the sensor 530 may detect an occasion when the cover (e.g., the cover 302) of the electronic device 300 is in the open state and in the closed state. According to an embodiment, the processor 510 may be electrically connected to the sensor 530 and receive a signal indicating that the cover (e.g., the cover 302) is in the open or closed state, from the sensor 530. When one or more of the earbuds 202 and 204 are positioned in the electronic device 300, and the cover (e.g., the cover 302) switches from the closed state to the open state, the processor 510 may generate a signal to turn on the communication circuit (e.g., the communication circuit 420) of the earbuds 202 and 204 and, when one or more of the earbuds 202 and 204 are positioned in the electronic device 300, and the cover (e.g., the cover 302) switches from the open state to the closed state, the processor 510 may generate a signal to turn off the communication circuit (e.g., the communication circuit 420) of the earbuds 202 and 204. According to an embodiment, when the cover (e.g., the cover 302) is in the open state and/or the earbuds 202 and 204 are in the mounted state, the sensor 530 may trigger the processor 510 to perform the operation (hereinafter, referred to as a pairing support operation) of transmitting a pairing support signal to support pairing for the earbuds 202 and 204 according to an embodiment described below.

According to an embodiment, the at least one charging indicator 540 may indicate the charge level of the battery 560 and/or the batteries (e.g., the battery 470) of the earbuds 202 and 204. Through the charging indicator 540 on the surface of the electronic device 300, the user may identify the amount of charge of the battery 560 of the electronic device 300 or the amount of charge of the batteries (e.g., the battery 470) of the earbuds 202 and 204. The charging indicator 540 may be implemented as a display or may be implemented as an LED.

According to an embodiment, the input device 550 may be configured to generate various input signals that may be used for operation of the electronic device 300. The input device 550 may include one or more of a touch pad, a touch panel, or a button. The touch pad may recognize touch inputs in one or more of capacitive, resistive, infrared, or ultrasonic methods. If a capacitive touch pad is provided, physical contact or proximity recognition may be possible. The touch pad may further include a tactile layer. The touch pad including the tactile layer may provide a tactile response to the user. The button may include, e.g., a physical button or an optical key. According to an embodiment, the processor 510 may detect the user's intent to support pairing of the earbuds 202 and 204 through the input device 550 and determine to transmit a pairing support signal for the earbuds 202 and 204.

According to an embodiment, the interface 515 may support one or more designated protocols to be used for the electronic device 300 to be wiredly or wirelessly connected with the earbuds 202 and 204. According to an embodiment, the interface 515 may include at least one of, e.g., an HDMI, a USB interface, an SD card interface, a PLC interface, or an audio interface. According to an embodiment, the interface 515 may include at least one connection port (e.g., the electric contacts 310 and 312) for establishing a physical connection with the earbuds 202 and 204. In an embodiment, the interface 515 may include at least one connection port (e.g., the electric contacts 310 and 312) that may physically contact the electric contact (e.g., the electric contact 316) of the first earbud 202 and the electric contact (e.g., the electric contact 318) of the second earbud 204.

According to an embodiment, the processor 510 may identify whether a physical connection is established between the electronic device 300 and the earbuds 202 and 204 through the interface 515. According to an embodiment, if the processor 510 identifies a physical contact between the first external electronic device 301 and the electronic devices 201 and 202 through the interface 515, the processor 510 may generate a charging signal that initiates charging of the earbuds 202 and 204. According to an embodiment, the processor 510 may identify, through the interface 515, that either or both of the earbuds 202 and 204 have been removed from the electronic device 300, and the processor 510 may generate a removal signal for stopping charging of the removed earbuds 202 and 204. According to an embodiment, the processor 510 may detect that one or both of the earbuds 202 and 204 are mounted on the mounting units (e.g., the first mounting unit 306 and the second mounting unit 308) provided in the housing of the electronic device 300 through the interface 515 and determine to transmit a pairing support signal for the earbuds 202 and 204.

The power interface 590 may support one or more designated protocols that may be used for the electronic device 300 to directly or wirelessly connect to the power source 595 or the electronic device (e.g., the electronic device 101). The power interface 590 according to an embodiment may include at least some of a USB connector, a lightening connector, or a receptacle connector for another connector capable of providing power to the electronic device 300. The power interface 590 according to an embodiment may adopt a structure including an antenna to wirelessly receive power from the power source 595 or an electronic device (e.g., the electronic device 101).

According to an embodiment, the memory 580 may store various data used by at least one component (e.g., the processor 510 or a sensor 530) of the electronic device 300. The various data may include, for example, software and input data or output data for a command related thereto. The memory 580 may include a volatile memory and/or a non-volatile memory.

According to an embodiment, the memory 580 may store configuration information related to a Bluetooth communication connection. The configuration information may include one or both of identification information about the electronic device 300 and device information about the earbuds 202 and 204. According to an embodiment, the identification information about the electronic device 300 may include a Bluetooth device address (e.g., BD_ADDR) or BLE address generated based on the Bluetooth device address. According to an embodiment, the identification information for the electronic device 300 may include communication address information (e.g., MAC address) about the electronic device 300 or may include unique identification information, such as a serial number, set by the manufacturer of the electronic device 300. The identification information about the electronic device 300 is not limited to the above example and may include information in various formats for identifying the electronic device 300.

According to an embodiment, the device information about the earbuds 202 and 204 may include a Bluetooth device address (e.g., BD_ADDR) of one or both thereof or BLE address generated based on the Bluetooth device address. According to an embodiment, the device information may further include device type information about one or both of the earbuds 202 and 204. The device type information may indicate either a primary role or a secondary role. According to an embodiment, each Bluetooth device address may be a Bluetooth device address in one of various formats. According to an embodiment, the device information may include identification information (e.g., MAC address or serial number) in one of various formats capable of identifying one or both of the earbuds 202 and 204.

According to an embodiment, the device information may further include, as additional information related to a connection with the first earbud 202 and/or the second earbud 204, at least one of, e.g., a device name, a Bluetooth version, a device class (class of device, CoD), battery level, clock information, current connection status, page scan mode information, transmit power level, service class, at least one universally unique identifier (UUID), or manufacturer data. In the disclosure, the device address, as information related to a connection with the first earbud 202 and/or the second earbud 204, and information other than the Bluetooth device address may be referred to as additional device information.

In an embodiment, the device information may further include, as additional information related to the connection with the first earbud 202 and/or the second earbud 204, the Bluetooth type (e.g., whether it supports Bluetooth legacy or BLE or both) and/or request information indicating the Bluetooth type (e.g., either Bluetooth legacy or BLE) desired to be used for connection with an external electronic device.

According to an embodiment, the memory 580 may store information regarding use of at least one of an NFC tag, a radio frequency identification (RFID) tag, a magnetic secure transmission (MST) device, a quick response (QR) code, or a bar code. According to an embodiment, at least one of an NFC tag, an RFID tag, an MST device, a QR code, or a barcode may be included in one of the illustrated components of the electronic device 300 or may be implemented as a separate component in the electronic device 300. One or more of the NFC tag, the RFID tag, the MST device, the QR code, or the barcode may store one or both of the identification information about the electronic device 300 and the device information about the earbuds 202 and 204.

According to an embodiment, the power management module 570 may manage power supplied to the electronic device 300. According to an embodiment, the power management module 570 may be implemented as at least part of, for example, a PMIC. According to an embodiment, the power management module 570 may include a battery charging module. According to an embodiment, the power management module 570 may wirelessly or wiredly receive power from the power source 595 or the electronic device (e.g., the electronic device 101) under the control of the processor 510 and charge the battery 560. According to an embodiment, the power management module 570 may wirelessly or wiredly provide the power of the battery 560 to the earbuds 202 and 204 through the interface 515 or at least one antenna of the communication circuit 520 under the control of the processor 510.

The battery 560 may supply power to at least one component of the electronic device 300. According to an embodiment, the battery 560 may include at least one of, e.g., a primary cell which is not rechargeable, a secondary cell which is rechargeable, or a fuel cell.

According to an embodiment, at least one of the earbuds 202 and 204 may identify one or more of the identification information about the electronic device 300 stored in at least one of the memory 580, the NFC tag, the RFID tag, the MST tag, QR code, or barcode from the electronic device 300 through the communication circuit (e.g., the communication circuit 420) or the sensor (e.g., the sensor 440) and establish a communication connection with the electronic device 300.

According to an embodiment, the electronic device 300 may further include various modules depending on the form in which it is provided. There are many variations according to the convergence trend of digital devices, so it is not possible to list them all, but components equivalent to the above-mentioned components may be further included in the electronic device 300. Further, it is apparent that in the electronic device 300 according to an embodiment, specific components may be excluded from the above components or replaced with other components according to the form in which it is provided. This will be easily understood by those of ordinary skill in the art.

Figure 6:
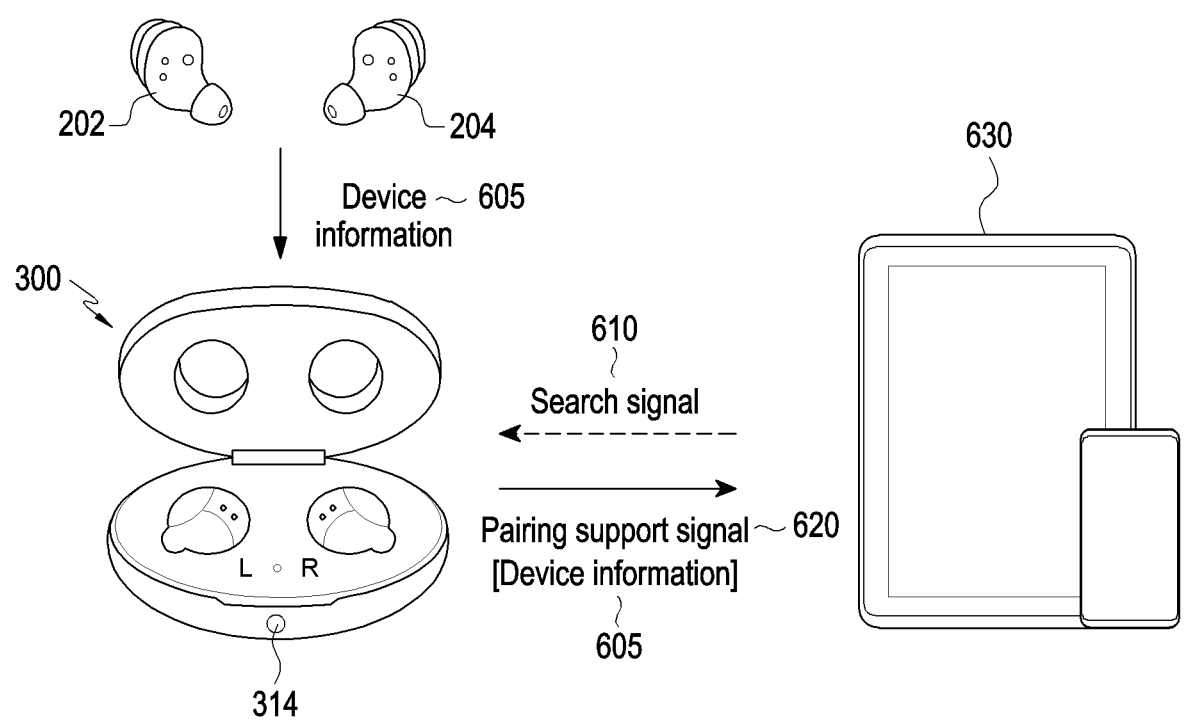
FIG. 6 illustrates a pairing support operation by an electronic device according to one embodiment.

FIG. 6 illustrates a pairing support operation by an electronic device 300 according to one embodiment.

Referring to FIG. 6, the electronic device 300 may perform various operations including, but not limited to, store the first earbud 202 and the second earbud 204, determine the status (e.g., battery status) of the first earbud 202 and the second earbud 204, and charge the first earbud 202 and the second earbud 204, identify the placement status of the first earbud 202 and/or the second earbud 204, and communicate with the first earbud 202 and/or the second earbud 204 using a wired and/or wireless communication scheme. In an embodiment, the electronic device 300 may obtain, store, update, and/or delete the device information 605 (e.g., Bluetooth device address BD_ADDR) about the first earbud 202 and/or the second earbud 204.

In an embodiment, the device information 605 may include the Bluetooth device address of the first earbud 202 and/or the second earbud 204. In an embodiment, the device information 605 may be provided to the electronic device 300 using a wired or wireless communication scheme. In an embodiment, the device information may be transferred from the first earbud 202 and/or the second earbud 204 to the electronic device 300. In an embodiment, the electronic device 300 may previously store the device information 605 about the first earbud 202 and/or the second earbud 204 or receive the device information 605 from an external electronic device (e.g., the external electronic device 630 or server).

The electronic device 300 may identify the user's intent to pair the first earbud 202 and/or the second earbud 204 with an external electronic device (e.g., the electronic device 101 or the external electronic device 630) through the input device 314 (e.g., the input device 550) (e.g., including at least one of a button, a touchpad, a touch panel, or a switch) and transmit a pairing support signal 620 including the device information 605 about the first earbud 202 and/or the second earbud 204 to be received by the external electronic device (e.g., the electronic device 101 or the external electronic device 630). In an embodiment, the pairing support signal 620 may be transmitted from the electronic device 300 to support a Bluetooth connection (e.g., a Bluetooth legacy communication connection or BLE communication connection) between the external electronic device (e.g., the electronic device 101 or the external electronic device 630) and the first earbud 202 and/or the second earbud 204.

In an embodiment, the pairing support signal 620 may be an inquiry response packet transmitted to support a Bluetooth legacy communication connection between the first earbud 202 and/or the second earbud 204 and the external electronic device 630. In response to identifying the user's intent, the electronic device 300 may enter the inquiry scan mode and, upon receiving a search signal 610 (e.g., an inquiry packet for Bluetooth legacy communication) transmitted from the external electronic device 630 in the inquiry scan mode, transmit an inquiry response packet including the device information 605 about the first earbud 202 and/or the second earbud 204 in response to reception of the inquiry packet. The external electronic device 630 may obtain the device information 605 about the first earbud 202 and/or the second earbud 204 from the inquiry response packet and establish a Bluetooth legacy communication connection with the first earbud 202 and/or the second earbud 204 using the device information 605.

In an embodiment, the pairing support signal 620 may be an advertising packet transmitted in the BLE advertising mode to support BLE communication between the first earbud 202 and/or the second earbud 204 and the external electronic device 630. In response to identifying the user's intent, the electronic device 300 may enter the advertising mode for BLE communication and transmit an advertising packet including the device information 605 about the first earbud 202 and/or the second earbud 204 in the advertising mode. The external electronic device 630 may obtain the device information 605 about the first earbud 202 and/or the second earbud 204 from the advertising packet and establish a BLE communication connection with the first earbud 202 and/or the second earbud 204 using the device information 605.

Figure 7A:
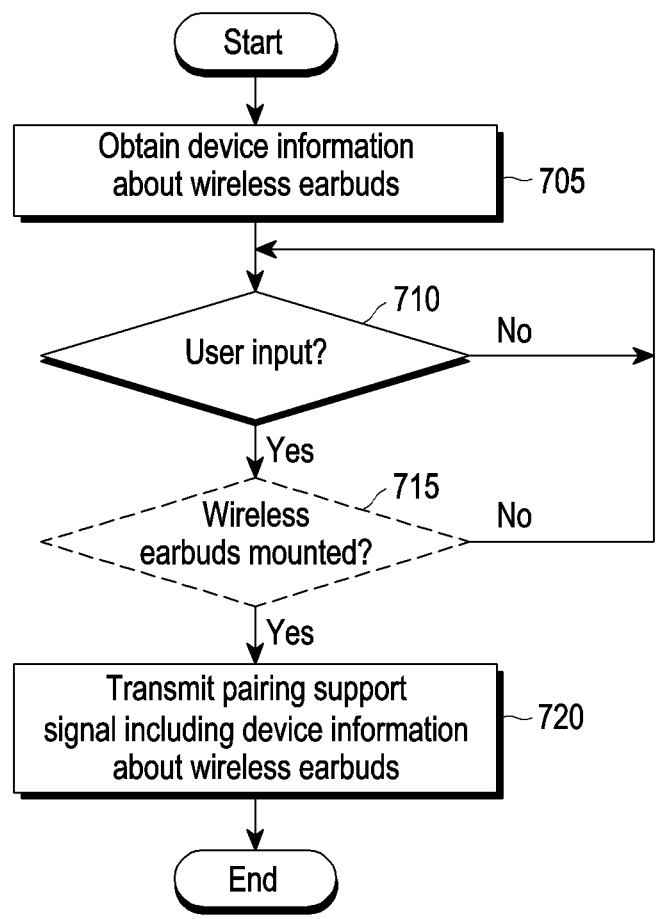
FIGS. 7A and 7B are flowcharts illustrating an operation of transmitting a pairing support signal by an electronic device according to one embodiment.
Figure 7B:
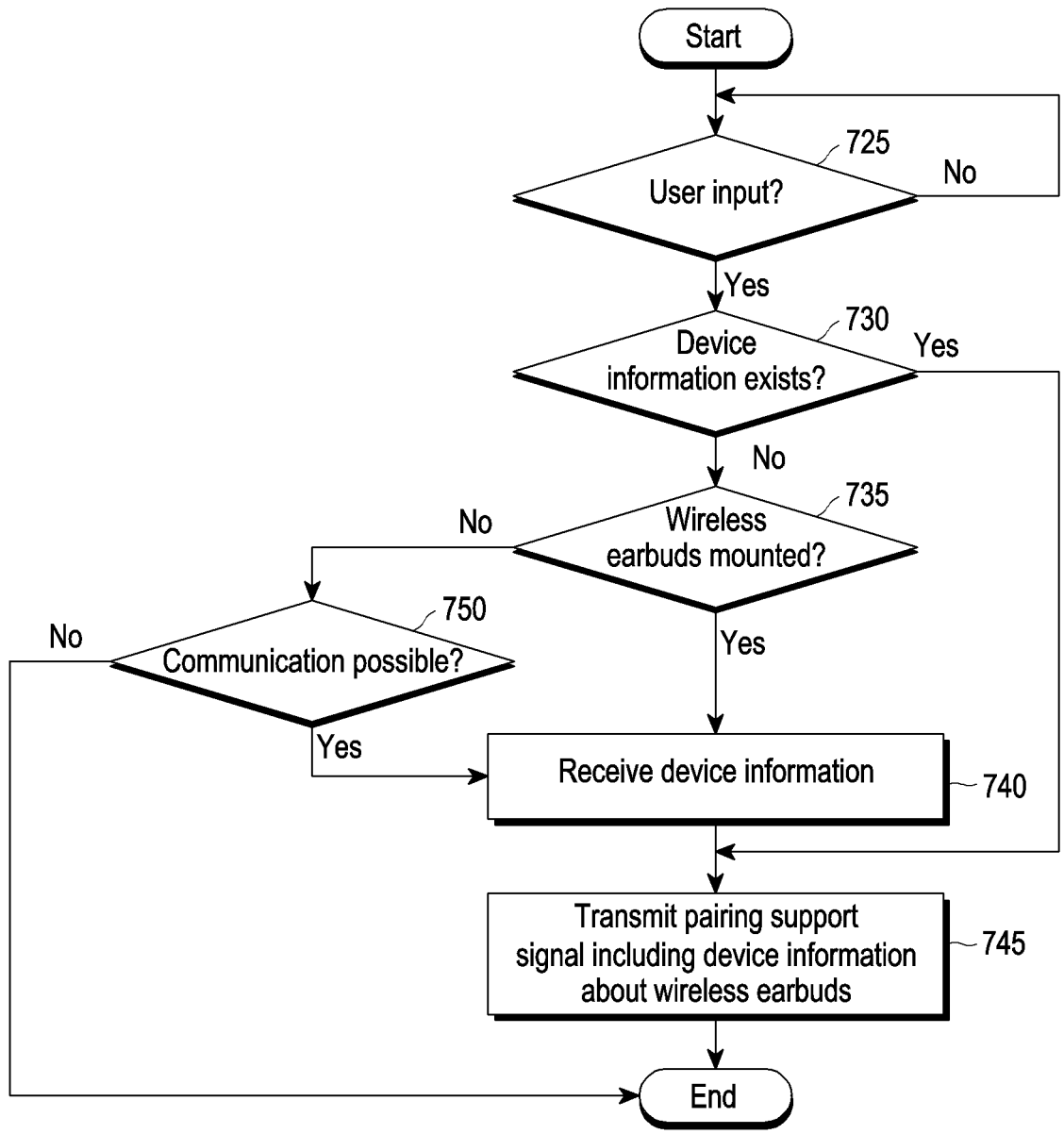

FIGS. 7A and 7B are flowcharts illustrating operations of transmitting a pairing support signal by an electronic device 300 according to one embodiment. According to embodiments, the operations shown in FIGS. 7A and 7B are not limited to the shown order but may rather be performed in other various orders. According to embodiments, more or less operations than those of FIGS. 7A and 7B may be performed without departing from the scope of the present disclosure. According to an embodiment, the operations illustrated in FIGS. 7A and 7B may be implemented as instructions executed by a processor (e.g., the processor 510) included in the electronic device 300.

FIG. 7A illustrates an embodiment of a procedure for transmitting a pairing support signal from the electronic device 300.

Referring to FIG. 7A, in operation 705, the electronic device 300 may obtain device information (e.g., the device information 605) about a pair of earbuds 200 (or one or both of the first earbud 202 and the second earbud 204) that may be mounted in the electronic device 300. In an embodiment, the device information may include the Bluetooth device address of either (e.g., the primary earbud) the first earbud 202 or the second earbud 204. In an embodiment, the device information may include the Bluetooth device addresses corresponding to one or both the first earbud 202 and the second earbud 204. In an embodiment, the device information may further include additional device information about one or both of the first earbud 202 and the second earbud 204, e.g., one or more of the BLE address, device type, identification information, device name, Bluetooth version, device class, battery level, clock information, current connection status, page scan mode information, transmit power level, service class, UUID, or manufacturer data.

In an embodiment, the device information may be transmitted, through wireless communication, from the first earbud 202 and the second earbud 204 to the electronic device 300 before either the first earbud 202 or the second earbud 204 is mounted in the electronic device 300. In an embodiment, the device information may be transmitted through wired communication or wireless communication, from the first earbud 202 and the second earbud 204 to the electronic device 300, when or while either the first earbud 202 or the second earbud 204 is mounted in the electronic device 300. In an embodiment, when the cover 302 is switched from the open state to the closed state, with either the first earbud 202 or the second earbud 204 mounted in the electronic device 300, the electronic device 300 may obtain device information from either the first earbud 202 or the second earbud 204 through wired communication (e.g., PLC communication).

In an embodiment, the device information may be stored in the memory (e.g., the memory 580) of the electronic device 300 by at least one of the manufacturer, the user, or an engineer. In an embodiment, the device information may be received from a server (e.g., the server 108 of FIG. 1) or external electronic device (e.g., the electronic device 101 or the electronic device 630) to the electronic device 300 by the user's intended action using a specific application (e.g., a wearable application) of the external electronic device (e.g., the electronic device 101 or the electronic device 630)

In operation 710, the electronic device 300 may determine whether a user input intended to pair the wireless earbuds 200 exists. In an embodiment, the electronic device 300 may directly detect the user input through an input device (e.g., the input device 314) provided in the housing. In an embodiment, the input device 314 may be a physical button, a touch pad, or a switch. Upon detecting a predetermined time of, or longer, long push or touch, or switch on, the electronic device 300 may determine that a user input intended to pair with the wireless earbuds 200 is received.

When no user input is detected, the electronic device 300 may return to operation 710. When the user input is detected, the electronic device 300 may proceed to operation 715. In an embodiment, when the user input is detected, the electronic device 300 may skip operation 715 and proceed to operation 720.

In an embodiment, in operation 710, the electronic device 300 may receive a request signal intended to pair with the wireless earbuds 200 from the user terminal (e.g., the electronic device 101) instead of directly detecting the user input through the input device 314. In an embodiment, the user terminal (e.g., the electronic device 101) may receive a user input requesting to connect the wireless earbuds 200 to another external electronic device (e.g., the external electronic device 630) and transmit a request signal intended to pair with the wireless earbuds 200 to the electronic device 300. To that end, the user terminal (e.g., the electronic device 101) may establish a communication connection (e.g., Bluetooth legacy communication connection or Bluetooth communication connection) with the electronic device 300. In response to reception of the request signal, the electronic device 300 may proceed to operation 715 or may skip operation 715 and proceed to operation 720.

In operation 715, the electronic device 300 may determine whether the wireless earbuds 200 (or one or both of the first earbud 202 or the second earbud 204) is mounted in the electronic device 300. In an embodiment, the electronic device 300 may determine whether the wireless earbuds 200 (or one or both of the first earbud 202 or the second earbud 204) is mounted on the mounting unit (e.g., the first mounting unit 306 and the second mounting unit 308) provided in the housing of the electronic device 300.

In an embodiment, when at least one of the first earbud 202 and the second earbud 204 contacts the electric contact (e.g., one or more of the electric contacts 310 and 312) of the electronic device 300, the electronic device 300 may determine that the at least one of the first earbud 202 and the second earbud 204 is mounted. In an embodiment, when at least one of the first earbud 202 and the second earbud 204 contacts the electric contact (e.g., at least one of the electric contacts 310 and 312) of the electronic device 300 and PLC communication is possible through a wired communication scheme or wireless communication with at least one of the first earbud 202 and the second earbud 204 is possible through a short-range communication scheme (e.g., Bluetooth legacy or BLE), the electronic device 300 may determine that the at least one of the first earbud 202 and the second earbud 204 is mounted in the electronic device 300.

In an embodiment, the electronic device 300 may detect, through the interface (e.g., the interface 515 (e.g., including the electric contacts 310 and 312)), whether one or both of the first earbud 202 and the second earbud 204 included in the wireless earbuds 200 is mounted on at least one of the first mounting unit 306 and the second mounting unit 308. When one or both of the first earbud 202 and the second earbud 204 included in the wireless earbuds 200 is not mounted, the electronic device 300 may return to operation 710. In an embodiment, the electronic device 300 may return to operation 710 when neither the first earbud 202 nor the second earbud 204 is mounted.

In an embodiment, the electronic device 300 may proceed to operation 720 when one or both of the first earbud 202 and the second earbud 204 is mounted. In an embodiment, the electronic device 300 may proceed to operation 720 when both the first earbud 202 and the second earbud 204 are mounted. In an embodiment, when neither the first earbud 202 nor the second earbud 204 is mounted, the electronic device 300 may measure the position of the first earbud 202 and the second earbud 204 according to a given scheme (which may include, e.g., the operation of detecting a signal from the first earbud 202 and the second earbud 204) and, upon identifying that the first earbud 202 and the second earbud 204 are positioned within a given distance from the electronic device 300, proceed to operation 720.

In operation 720, the electronic device 300 may transmit a pairing support signal (e.g., the pairing support signal 620) including the device information about the wireless earbuds 200. In an embodiment, the device information may include the Bluetooth device address of the first earbud 202 and/or the second earbud 204. In an embodiment, the device information may further include additional device information related to connection with the first earbud 202 and the second earbud 204 (e.g., at least one of the BLE address, device type, identification information, device name, Bluetooth version, device class, battery level, clock information, current connection status, page scan mode information, transmit power level, service class, UUID, manufacturer data, and/or the Bluetooth device address of a remaining earbud among a pair of earbuds, e.g., Bluetooth device address of the secondary earbud when the primary earbud transmits the additional device information or Bluetooth device address of the primary earbud when the secondary earbud transmits the additional device information).

In an embodiment, in operation 705, upon obtaining device information about either the first earbud 202 or the second earbud 204, the electronic device 300 may include device information about only either the first earbud 202 or the second earbud 204 in the pairing support signal. In an embodiment, in operation 705, upon obtaining device information about both the first earbud 202 and the second earbud 204, the electronic device 300 may include device information about both the first earbud 202 and the second earbud 204 in the pairing support signal.

FIG. 7B illustrates another embodiment of a procedure for transmitting a pairing support signal from the electronic device 300.

Referring to FIG. 7B, in operation 725, the electronic device 300 may determine whether a user input intended to pair the wireless earbuds 200 exists. In an embodiment, the electronic device 300 may directly detect the user input through an input device (e.g., the input device 314) provided in the housing. When no user input is detected, the electronic device 300 may return to operation 725. When the user input is detected, the electronic device 300 may proceed to operation 730.

In an embodiment, in operation 725, the electronic device 300 may receive a request signal intended to pair with the wireless earbuds 200 from the user terminal (e.g., the electronic device 101) instead of directly detecting the user input. The electronic device 300 may proceed to operation 730 in response to the reception of the request signal.

In operation 730, the electronic device 300 may determine whether device information about the wireless earbud 200 (or either the first earbud 202 or the second earbud 204) exists. When the device information is stored in the memory (e.g., the memory 580) of the electronic device 300, the electronic device 300 may proceed to operation 745. In contrast, when the device information does not exist in the electronic device 300, the electronic device 300 may proceed to operation 735.

In operation 735, the electronic device 300 may determine whether the wireless earbud 200 (or either the first earbud 202 or the second earbud 204) is mounted in the electronic device 300. In an embodiment, when at least one of the first earbud 202 and the second earbud 204 contacts the electric contact (e.g., one or both of the electric contacts 310 and 312) of the electronic device 300, the electronic device 300 may determine that the at least one of the first earbud 202 and the second earbud 204 is mounted. When one or both of the first earbud 202 and the second earbud 204 included in the wireless earbuds 200 are mounted in the electronic device 300, the electronic device 300 may proceed to operation 740.

In operation 740, the electronic device 300 may receive device information from one or both of the first earbud 202 and the second earbud 204. In an embodiment, the device information may be transferred through wired communication (e.g., PLC communication) between the electronic device 300 and one or both of the first earbud 202 and the second earbud 204.

When it is determined in operation 735 that one or both of the first earbud 202 and the second earbud 204 included in the wireless earbuds 200 is not mounted or neither is mounted in the electronic device 300, the electronic device 300 may proceed to operation 750. In another embodiment, when one or both of the first earbud 202 and the second earbud 204 included in the wireless earbuds 200 is not mounted, or neither is mounted, in the electronic device 300, the electronic device 300 may determine that the pairing support operation is impossible and thus skip operation 750 and terminate the procedure.

In operation 750, the electronic device 300 may determine whether to be able to communicate with one or both of the first earbud 202 and the second earbud 204. In an embodiment, the electronic device 300 may determine whether a communication connection (e.g., Bluetooth legacy communication connection or BLE communication connection) with one or both of the first earbud 202 and the second earbud 204 is established. When it is possible to communicate with one or both of the first earbud 202 and the second earbud 204, the electronic device 300 may proceed to operation 740 to receive device information from one or both of the first earbud 202 and the second earbud 204 through the communication connection. If necessary, the electronic device 300 may perform a procedure for establishing a communication connection with one or both of the first earbud 202 and the second earbud 204. When it is impossible to communicate with one or both of the first earbud 202 and the second earbud 204 in operation 750, the electronic device 300 may determine that the pairing support operation is impossible and terminate the procedure.

After receiving the device information in operation 740, in operation 745, the electronic device 300 may transmit a pairing support signal (e.g., the pairing support signal 620) including the device information about the wireless earbuds 200. In an embodiment, the device information may include the Bluetooth device address of the first earbud 202 and/or the second earbud 204. In an embodiment, the device information may further include additional device information related to connection with the first earbud 202 and the second earbud 204 (e.g., one or more of the BLE address, device type, identification information, device name, Bluetooth version, device class, battery level, clock information, current connection status, page scan mode information, transmit power level, service class, UUID, or manufacturer data).

In an embodiment, in operation 740, upon obtaining device information about either the first earbud 202 or the second earbud 204, the electronic device 300 may include device information about only either the first earbud 202 or the second earbud 204 in the pairing support signal. In an embodiment, in operation 740, upon obtaining device information about both the first earbud 202 and the second earbud 204, the electronic device 300 may include device information about both the first earbud 202 and the second earbud 204 in the pairing support signal.

In an embodiment, the pairing support signal transmitted in operation 720 or operation 745 may be an inquiry response packet transmitted in response to the inquiry packet received in the inquiry scan mode for Bluetooth legacy communication. In an embodiment, the pairing support signal may be an advertising packet transmitted in the BLE advertising mode. In an embodiment, the pairing support signal transmitted in operation 720 or operation 745 may be transmitted to be received by an external electronic device (e.g., the electronic device 101 or the external electronic device 630) positioned around the electronic device 300. In an embodiment, the electronic device 630 may obtain the device information (e.g., Bluetooth device address) about the wireless earbuds 200 through reception of the pairing support signal and perform paging for pairing with the wireless earbuds 200 using the device information, thereby connecting with the wireless earbuds 200.

According to an embodiment, the electronic device 300 may transmit a pairing support signal including the device information and output a user indication indicating that the device information has been transmitted. In an embodiment, the electronic device 300 may notify the user that the pairing support operation (including, e.g., the operation of transmitting the pairing support signal including the device information about the wireless earbuds 200) is being performed, through an LED variation (specific color and/or flicker), vibration, or playback of a specific sound.

According to an embodiment, the electronic device 300 may use various schemes to determine the pairing support operation of transmitting the pairing support signal (e.g., the pairing support signal 620) including the device information about the wireless earbuds 200. In an embodiment, the electronic device 300 may determine whether to perform the pairing support operation based on at least one of the user input of operation 710, the mounting status of operation 715, or the open state of the cover (e.g., the cover 302) of the electronic device 300. In an embodiment, upon receiving a user input intending a pairing operation in the open state of the cover 302, the electronic device 300 may determine to perform the pairing support operation. In an embodiment, upon receiving a user input intending the pairing operation in a state in which the cover 302 is open, and the first earbud 202 and/or the second earbud 204 is mounted, the electronic device 300 may determine to perform the pairing support operation. In an embodiment, upon detecting that the cover 302 is open after detecting the user input intending the pairing operation, the electronic device 300 may determine to perform the pairing support operation.

In an embodiment, when at least one of the first earbud 202 and the second earbud 204 is mounted in the electronic device 300 in a state of having detected that the user intends the pairing operation based on the open state of the cover 302 and/or the user input, the electronic device 300 may perform the pairing support operation. In an embodiment, when the battery status of the electronic device 300 is a designated battery level or more in a state of having detected that the user intends the pairing operation based on the open state of the cover 302 and/or the user input, the electronic device 300 may perform the pairing support operation.

Figure 8:
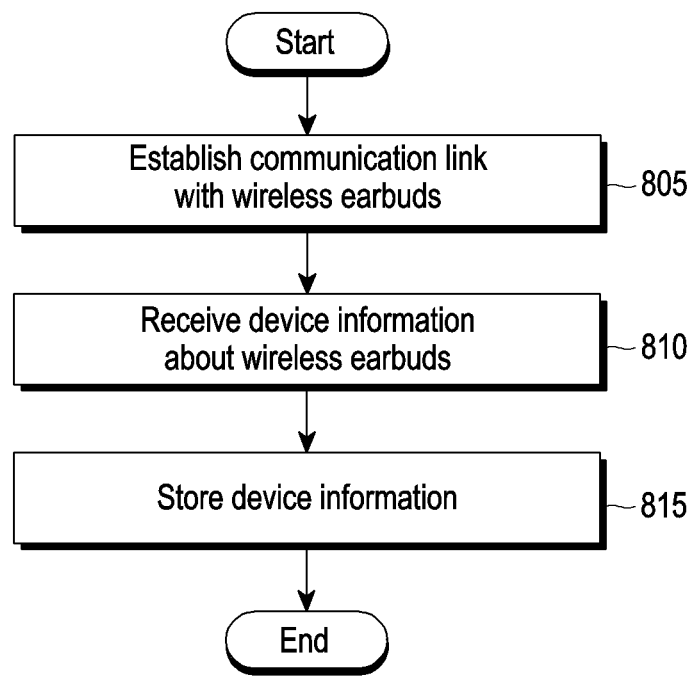
FIG. 8 is a flowchart illustrating an operation of obtaining device information according to one embodiment.

FIG. 8 is a flowchart illustrating an operation of obtaining device information according to one embodiment. According to an embodiment, the operations illustrated in FIG. 8 may correspond to operation 705 of FIG. 7A and/or operation 740 of FIG. 7B.

Referring to FIG. 8, in operation 805, the electronic device 300 may establish a communication link with a pair of wireless earbuds 200 (or at least one of the first earbud 202 and the second earbud 204). In an embodiment, the electronic device 300 may establish a communication link with at least one of the first earbud 202 and the second earbud 204 based on a wired communication scheme (e.g., PLC) or a wireless communication scheme (e.g., Bluetooth legacy or BLE), at any one time of various times that may include at least one of the time when at least one of the first earbud 202 and the second earbud 204 is mounted in the electronic device 300, the time when at least one of the first earbud 202 and the second earbud 204 is removed from the electronic device 300, the time when the cover (e.g., the cover 302) of the electronic device 300 is open or closed, the time when the charging of the electronic device 300 starts or stops, or the time of detecting a user input intended to pair with the wireless earbuds 200.

In an embodiment, when at least one of the first earbud 202 and the second earbud 204 is mounted in the electronic device 300, the electric contact (e.g., at least one of the electric contacts 310 and 312) for charging the electronic device 300 and the electric contact (e.g., the first electric contact 316 or the second electric contact 318) for charging at least one of the first earbud 202 and the second earbud 204 contact each other so that a communication link may be established in the wired communication scheme. By detecting the contact to at least one of the electric contacts (e.g., the electric contacts 310 and 312), the electronic device 300 may identify that at least one of the first earbud 202 and the second earbud 204 is mounted. In an embodiment, at least one of the first earbud 202 and the second earbud 204 may be charged with the power from the electronic device 300 by being connected with the electric contact (e.g., at least one of the electric contacts 310 and 312), and a PLC scheme-based communication link with the electronic device 300 may be established through the electric contact (e.g., at least one of the electric contacts 310 and 312).

In an embodiment, the electronic device 300 may establish a wireless communication link with at least one of the first earbud 202 and the second earbud 204 based on a wireless communication scheme, e.g., Bluetooth legacy BLE, etc., at any one time of the various times.

In operation 810, the electronic device 300 may receive device information from at least one of the first earbud 202 and the second earbud 204. In an embodiment, the electronic device 300 may receive device information about at least one of the first earbud 202 and the second earbud 204 through the communication link established in operation 805, in any one of various time periods that may include the first time when at least one of the first earbud 202 and the second earbud 204 is mounted in the electronic device 300. In an embodiment, the electronic device 300 may receive the device information including, but not limited to, the Bluetooth device address, of the at least one of the first earbud 202 and the second earbud 204 through a first communication link established with the first earbud 202 via a wired or wireless communication scheme and/or a second communication link established with the second earbud 204 via a wired or wireless communication scheme.

In an embodiment, instead of individually performing operations 805 and 810, the electronic device 300 may obtain the device information during the course of establishing the wireless communication link with the first earbud 202 and/or the second earbud 204 based on a wireless communication scheme, such as a Bluetooth legacy, BLE, etc. In an embodiment, the electronic device 300 may obtain the device information from the inquiry response packet or advertising packet transmitted from the first earbud 202 and/or the second earbud 204.

In an embodiment, the device information may include at least one information necessary for the first earbud 202 and the second earbud 204 to pair with an external electronic device (e.g., the electronic device 101 or the external electronic device 630) in response to the inquiry operation or BLE scan operation of the external electronic device (e.g., the electronic device 101 or the external electronic device 630). In an embodiment, the device information may include, but is not limited to, the Bluetooth device address, Bluetooth version, device class, battery level, clock information, and current connection status for at least one of the first earbud 202 and the second earbud 204.

In operation 815, the electronic device 300 may identify the received device information and store the device information in the memory (e.g., the memory 580). In an embodiment, the electronic device 300 may update or delete the previous device information pre-stored in the memory 580 based on the received device information.

In an embodiment, the electronic device 300 may receive, store, update, and/or manage only device information about the primary earbud (e.g., the first earbud 202) that directly operates a link with the parent device. In an embodiment, the electronic device 300 may receive, store, update, and/or manage the device information about both the first earbud 202 and the second earbud 204.

According to an embodiment, when the first earbud 202 and the second earbud 204 use sniffing topology or relay topology using the Bluetooth legacy (BT legacy) scheme, the electronic device 300 may identify, store, and update only device information about the first earbud 202 (e.g., the primary earbud), directly establishing a communication link with the parent device (e.g., the electronic device 101 or the electronic device 630) and operating, of the first earbud 202 and the second earbud 204. According to an embodiment, when the first earbud 202 and the second earbud 204 use BLE audio (audio over BLE, AoBLE) topology, the electronic device 300 may identify, store, and update device information about both the first earbud 202 and the second earbud 204.

Figure 9A:
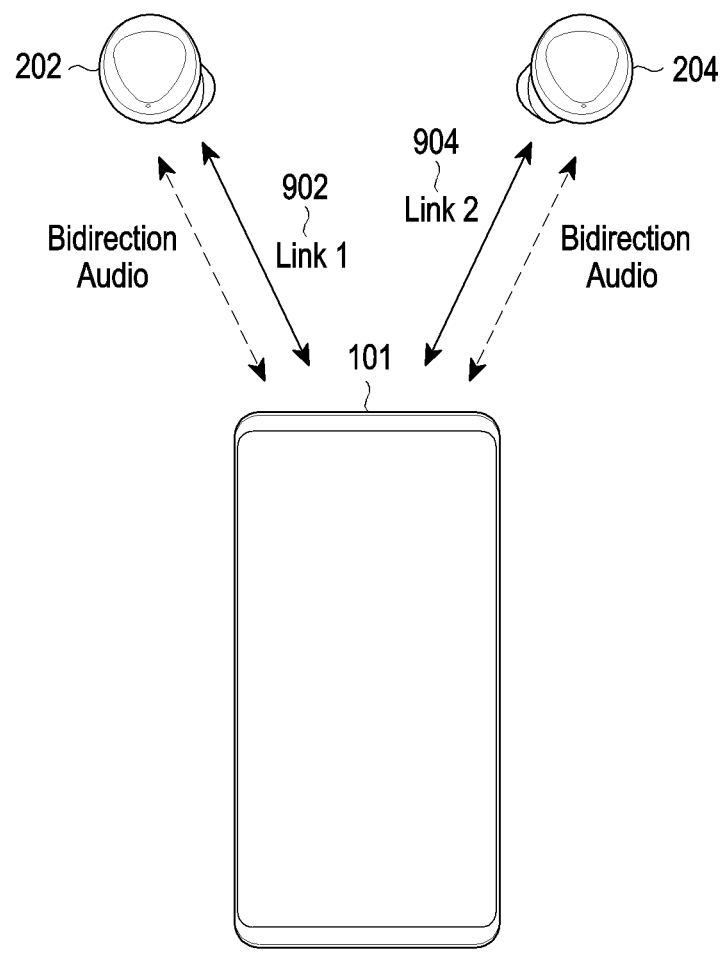
FIGS. 9A, 9B, and 9C illustrate examples of a scheme in which a first earbud and a second earbud are connected with an electronic device according to one embodiment.
Figure 9B:
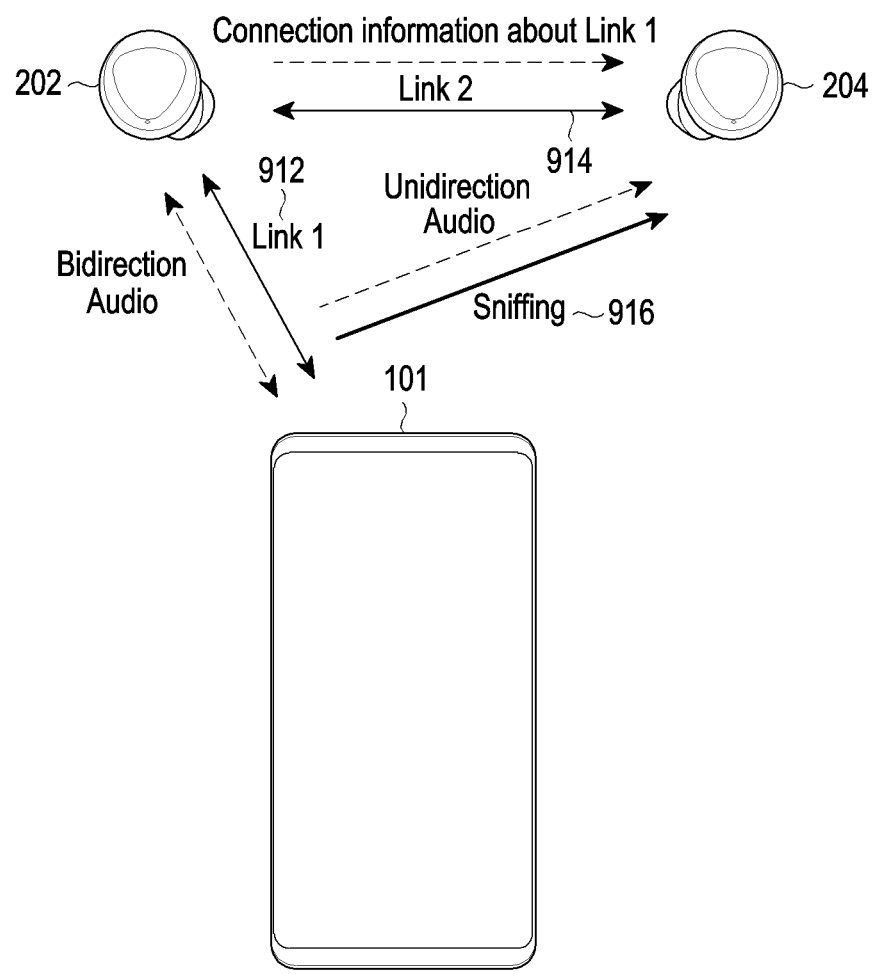
Figure 9C:
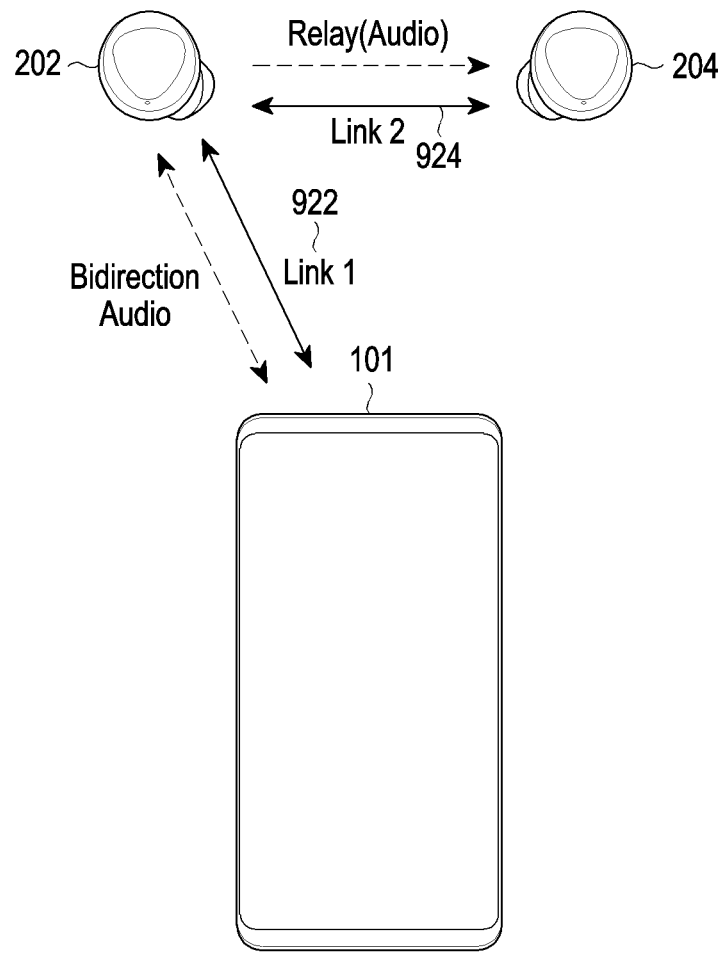

FIGS. 9A, 9B, and 9C illustrate examples of a scheme in which a first earbud 202 and a second earbud 204 are connected with an electronic device 101 according to one embodiment.

Referring to FIG. 9A, the electronic device 101 may establish a first communication link (Link 1) 902 and a second communication link (Link 2) 904 with the first earbud 202 and the second earbud 204, respectively. For example, the electronic device 101 may establish the first communication link 902 and the second communication link 904 with the first earbud 202 and the second earbud 204, respectively, using a "TrueWireless Stereo" (TWS) plus scheme and transmit/receive data through the first and second communication links 902 and 904. In an embodiment, the electronic device 101 may transmit bidirection audio to the first earbud 202 through the first communication link 902 and transmit and/or receive ("transmit/receive") bidirection audio to and/or from ("to/from") the second earbud 204 through the second communication link 904. The first earbud 202 may extract and reproduce the desired unidirection audio from the received bidirection audio. Likewise, the second earbud 204 may extract and reproduce the desired unidirection audio from the received bidirection audio.

In an embodiment, unidirection media (e.g., left media) and bidirection voice may be transferred through the first communication link 902, and unidirection media (e.g., right media) and bidirection voice may be transferred through the second communication link 904. According to an embodiment, the electronic device 101 may divide and manage frequency and/or time resources for transmitting/receiving data with the first earbud 202 and the second earbud 204.

According to an embodiment, when the first earbud 202 and the second earbud 204 are configured to communicate with the parent device (e.g., the electronic device 101) using the topology as shown in FIG. 9A, the electronic device 101 may transmit a pairing support signal including the device information about both the first earbud 202 and the second earbud 204. The external electronic device (e.g., the electronic device 101 or the electronic device 630) may receive the device information about both the first earbud 202 and the second earbud 204 from the electronic device 300, pair with each of the first earbud 202 and the second earbud 204 using the device information, establish a communication link (e.g., the first communication link 902) with the first earbud 202, and establish a communication link (e.g., the second communication link 904) with the second earbud 204.

According to an embodiment, the electronic device 300 may transmit pairing support signals, in a designated order, based on the information about the first earbud 202 and the second earbud 204. For example, the electronic device 300 may alternately transmit the pairing support signal based on the information about the first earbud 202 and the pairing support signal based on the information about the second earbud 204. According to an embodiment, the electronic device 300 may transmit the pairing support signals, according to priorities, based on the information about the first earbud 202 and the second earbud 204. For example, the electronic device 300 may transmit the pairing support signal based on the information about the higher-priority device (e.g., the first earbud 202) repeatedly for a designated time and/or a designated number of times.

Referring to FIG. 9B, the electronic device 101 may transmit/receive data with the first earbud 202 and the second earbud 204 through a first communication link (Link 1) 912 established with the first earbud 202 of the first earbud 202 and the second earbud 204. For example, the electronic device 101 may transmit/receive data (e.g., bidirection audio) for both the first earbud 202 and the second earbud 204 through the first communication link 912 established with the first earbud 202. The second earbud 204 may sniff (916) (or in other words detect) at least part of the data transmitted from the electronic device 101 to the first earbud 202 using a sniffing scheme.

In one embodiment, the first earbud 202 may establish a second communication link (Link 2) 914 with the second earbud 204. The second earbud 204 may obtain connection information about the first communication link 912 between the first earbud 202 and the electronic device 101 from the first earbud 202 through the second communication link 914. The second communication link 914 may be used to transfer connection information, rather than audio data. According to an embodiment, the second earbud 204 may share the first communication link 912 with the first earbud 202 to receive the data transmitted from the electronic device 101 through sniffing 916. This is merely an example, and the second earbud 204 may sniff (916) the data from the electronic device 101 by sharing the connection information about the first communication link 912 according to various sniffing topologies.

In an embodiment, the second earbud 204 may obtain connection information about the first communication link 912 from the electronic device 101. In an embodiment, the second earbud 204 may obtain connection information about the first communication link 912 through an external electronic device (not shown in FIG. 9B) (e.g., the electronic device 300). In an embodiment, the second earbud 204 may receive the signal broadcast by the first earbud 202 to obtain the connection information about the first communication link 912. In an embodiment, the second earbud 204 together with the first earbud 202 may receive a connection request signal sent by the electronic device 101 and may obtain the connection information about the first communication link 912.

According to an embodiment, the connection information about the first communication link 912 may include address information (e.g., the Bluetooth device address of the primary device (e.g., the first earbud 202) of the first communication link 912, the Bluetooth device address of the electronic device 101, and/or the Bluetooth device address of the first earbud 202), piconet (or topology) clock information (e.g., the clock native (CLKN) of the primary device (e.g., the first earbud 202) of the first communication link 912), logical transport (LT) address (e.g., assigned by the primary device (e.g., the first earbud 202) of the first communication link 912), used channel map, link key, service discovery protocol (SDP) information (e.g., information about the service and/or profile associated with the first communication link 912), and/or supported features. The connection information associated with the first communication link 912 may further include, e.g., an extended inquiry response (EIR) packet. The EIR packet may include resource control information about the first communication link 912 and/or information about the manufacturer.

According to an embodiment, the second earbud 204 may determine the frequency hopping channel of the first communication link 912 through addresses and a clock signal, and decrypt the encrypted data packets over the first communication link 912 through the link key. In an embodiment, the second earbud 204 may generate an access code (or channel access code) and address (e.g., LT address) corresponding to the first communication link 912 based on the connection information associated with the first communication link 912 and transmit a response message including the generated access code and address to the electronic device 101.

According to an embodiment, when the first earbud 202 and the second earbud 204 are configured to communicate with the parent device (e.g., the electronic device 101) using the topology as shown in FIG. 9B, the electronic device 300 may transmit a pairing support signal including the device information the first earbud 202. The external electronic device (e.g., the electronic device 101 or the electronic device 630) may receive the device information about the first earbud 202 from the electronic device 300, pair with the first earbud 202 using the device information and establish a communication link (e.g., the first communication link 912) with the first earbud 202.

In the topology as shown in FIG. 9B, the electronic device 300 may also transmit a pairing support signal including the device information about both the first earbud 202 and the second earbud 204. The external electronic device (e.g., the electronic device 101 or the electronic device 630) may receive the device information about both the first earbud 202 and the second earbud 204 from the electronic device 300, pair with each of the first earbud 202 and the second earbud 204 using the device information, establish a communication link (e.g., the first communication link 912) with the first earbud 202, establish a third communication link (not shown) with the second earbud 204, and provide connection information about the first communication link 912 to the second earbud 204 through the third communication link.

Referring to FIG. 9C, the electronic device 101 may establish the first communication link (Link 1) 922 with the first earbud 202 without connection with the second earbud 204. For example, the electronic device 101 may establish the first communication link 922 with the first earbud 202 using a TWS scheme and transmit/receive data (e.g., bidirection audio) through the first communication link 922. The electronic device 101 may transmit/receive data with the second earbud 204 through the first earbud 202. Unlike sniffing 916 of FIG. 9B, the second earbud 204 may establish a second communication link 924, through which audio data may be transferred, with the first earbud 202 and receive relay audio data from the first earbud 202 through the second communication link 924.

In an embodiment, the first earbud 202 may transfer, to the second earbud 204 through the second communication link 924, a remaining portion of the audio data (e.g., the left audio for the second earbud 204) except for the portion of audio data (e.g., the right audio for the first earbud 202) among the bidirection audio received through the first communication link 922. Further, the first earbud 202 may transfer the audio data and/or control data, received through the first communication link 924 from the second earbud 204, to the electronic device 101 through the first communication link 922.

According to an embodiment, when the first earbud 202 and the second earbud 204 are configured to communicate with the parent device (e.g., the electronic device 101) using the topology as shown in FIG. 9C, the electronic device 300 may transmit a pairing support signal including the device information the first earbud 202. The external electronic device (e.g., the electronic device 101 or the electronic device 630) may receive the device information about the first earbud 202 from the electronic device 300, pair with the first earbud 202 using the device information and establish a communication link (e.g., the first communication link 912) with the first earbud 202.

Figure 10:
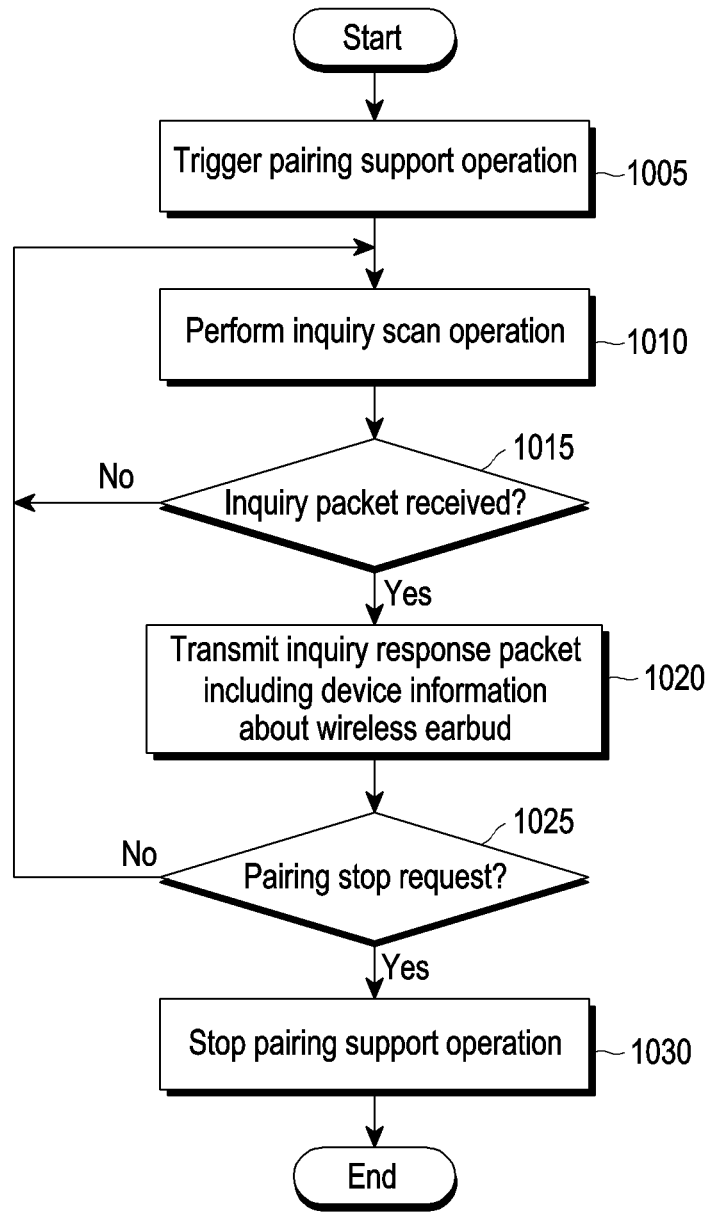
FIG. 10 is a flowchart illustrating a procedure of performing a pairing support operation according to one embodiments.

FIG. 10 is a flowchart illustrating an example of a procedure of performing a pairing support operation according to one embodiment. According to embodiments, the operations shown in FIG. 10 are not limited to the particular order illustrated in FIG. 10, but may rather be performed in other various orders. According to embodiments, more or less operations than those of FIG. 10 may be performed. According to an embodiment, the operations illustrated in FIG. 10 may be implemented as instructions executed by a processor (e.g., the processor 510) included in the electronic device 300.

Referring to FIG. 10, in operation 1005, the electronic device 300 may detect that a pairing support operation is triggered. In an embodiment, e.g., in Bluetooth legacy communication, the pairing support operation may include operations 1010, 1015, and 1020 described below.

In an embodiment, the triggering of the pairing support operation may be determined by at least one of operations 710 or 715 of FIG. 7A. In an embodiment, the pairing support operation may be triggered when there is a user input in operation 710 and it is detected at least one of the first earbud 202 and the second earbud 204 is mounted in the electronic device 300 in operation 715. In an embodiment, the pairing support operation may be triggered when there is a user input in operation 710 and it is detected in operation 715 that at least one of the first earbud 202 and the second earbud 204 is mounted in the electronic device 300 and/or the cover (e.g., the cover 302) of the electronic device 300 is open.

In an embodiment, the triggering of the pairing support operation may be determined by at least one of operations 725, 730, 735, or 750 of FIG. 7B. In an embodiment, the pairing support operation may be triggered when there is a user input in operation 725 and the device information is stored in the electronic device 300 in operation 730. In an embodiment, the pairing support operation may be triggered when there is a user input in operation 725, and the device information is received by the electronic device 300 from at least one of the first earbud 202 and the second earbud 204 in operations 735 and 740. According to other embodiments, the pairing support operation may be triggered.

In operation 1010, the electronic device 300 may perform an inquiry scan operation to determine whether a Bluetooth connection is available (e.g., Bluetooth legacy connection)

for one or both of the first earbud 202 and the second earbud 204. In an embodiment, the electronic device 300 may perform operation 1010 by a previous setting. In an embodiment, the electronic device 300 may perform operation 1010 based on the device information, e.g., Bluetooth type and/or request information, received from at least one of the first earbud 202 and the second earbud 204. In an embodiment, when the first earbud 202 and the second earbud 204 are determined to use Bluetooth legacy communication based on the request information, the electronic device 300 may perform operation 1010. In an embodiment, when the first earbud 202 and the second earbud 204 are determined to use BLE communication based on the request information, the electronic device 300 may proceed to operation 1510 of FIG. 15.

In operation 1015, the electronic device 300 may determine whether an inquiry packet is received from an external electronic device (e.g., the electronic device 101 or the electronic device 630) around, through the inquiry scan operation. Although not shown, unless an inquiry packet is received, the electronic device 300 may repeat the inquiry scan operation in operation 1015, a designated number of times or during a designated time period. When an inquiry packet is not received despite the inquiry scan operation during the designated time period or the designated number of times, the electronic device 300 may terminate the pairing support operation. When the inquiry packet is received at operation 1015, the electronic device 300 may proceed to operation 1020.

In operation 1020, the electronic device 300 may include and transmit device information about at least one of the first earbud 202 and the second earbud 204 in an inquiry response packet corresponding to the received inquiry packet. The inquiry response packet containing the device information may be received by the external electronic device (e.g., the electronic device 101 or the electronic device 630) that has transmitted the inquiry packet. After transmitting the inquiry response packet, the electronic device 300 may proceed to operation 1025.

In operation 1025, the electronic device 300 may determine whether to stop the pairing support operation. In an embodiment, the electronic device 300 may determine to stop the pairing support operation (e.g., inquiry scan operation) in response to detecting a stop event. The stop event includes one or a combination of, but is not limited to: detecting the designated battery status (e.g., less than a designated battery level) of the electronic device 300 and/or at least one of the first earbud 202 and the second earbud 204; when a designated time elapses after the pairing support operation is triggered in operation 1005; when a designated time elapses after the inquiry scan operation is started in operation 1010; when a user input for canceling the pairing support operation (e.g., inquiry scan operation) is received; when a stop instruction is received from at least one of the first earbud 202 and the second earbud 204; and when one or both of the first earbud 202 and the second earbud 204 are removed or disconnected from the electronic device 300. Unless the pairing support operation or inquiry scan operation is determined to be stopped, the electronic device 300 may return to operation 1010, continuing the inquiry scan operation.

When the pairing support operation or inquiry scan operation is determined to be stopped, the electronic device 300 may proceed to operation 1030, stopping the pairing support operation (e.g., inquiry scan operation).

According to an embodiment, the electronic device 300 may identify the user's intent for pairing support of the first earbud 202 and the second earbud 204 and perform an inquiry scan operation to respond to a search request for the external electronic device (e.g., the electronic device 101 or the electronic device 630) positioned around. The electronic device 300 may transfer, to the external electronic device (e.g., the electronic device 101 or the electronic device 630), device information (including, e.g., the Bluetooth device address) about at least one of the first earbud 202 and the second earbud 204, through an inquiry response packet.

Figure 11:
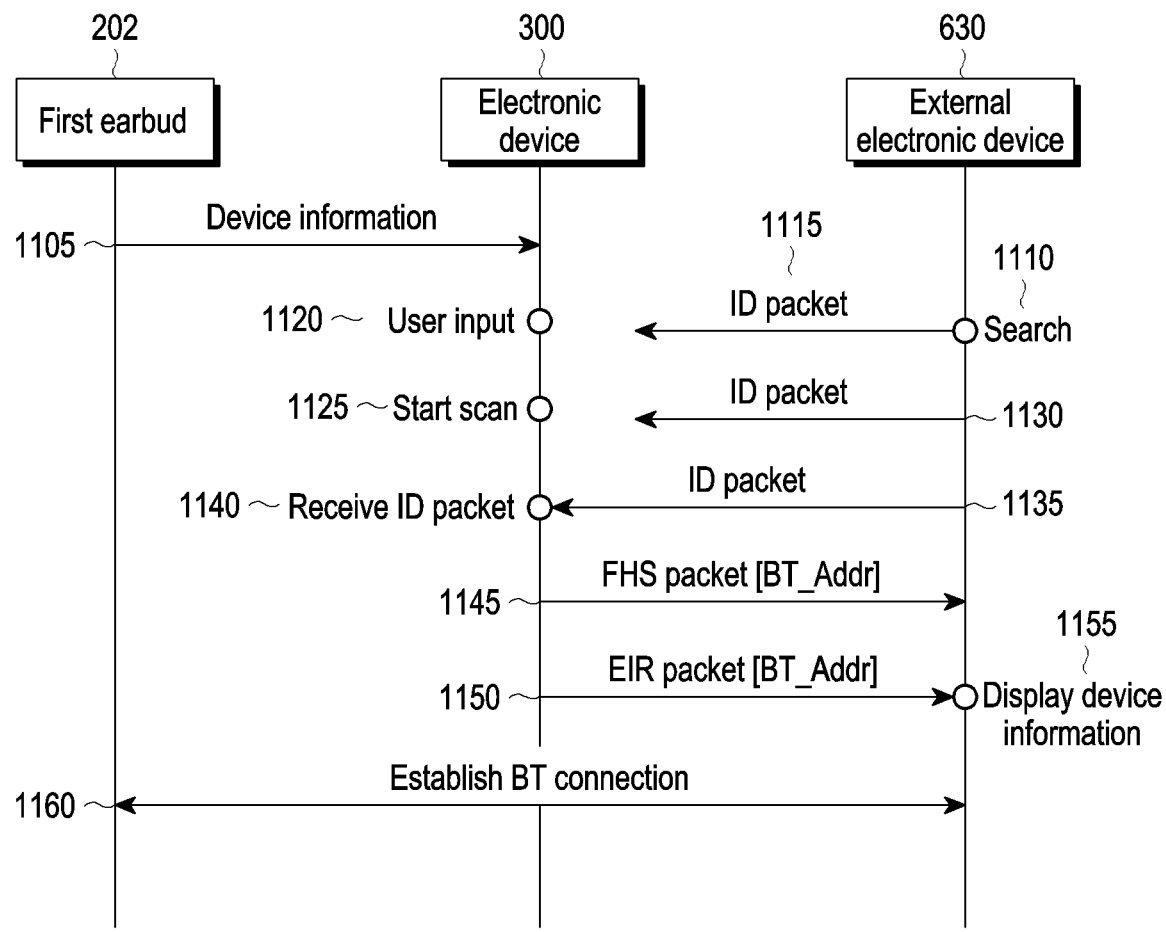
FIG. 11 is a sequence diagram illustrating an inquiry scan operation of an electronic device according to one embodiment.

FIG. 11 is a sequence diagram illustrating an inquiry response operation of an electronic device 300 according to one embodiment.

Referring to FIG. 11, in operation 1105, at least one earbud (e.g., the first earbud 202) may transmit device information to the electronic device 300. In an embodiment, the device information may include device information about at least one of the first earbud 202 and the second earbud 204. In an embodiment, the device information may include, but is not limited to, the Bluetooth device address of one or both of the first earbud 202 and the second earbud 204. In an embodiment, the device information may include device information about the first earbud 202. Although not shown, device information about the second earbud 204 may be transferred from the second earbud 204 to the electronic device 300. In another embodiment, the device information may be received by the electronic device 300, from at least one of the electronic device (e.g., the electronic device 101 or the electronic device 630), user, manufacturer, or server.

In an embodiment, the device information may be transferred from the first earbud 202 and/or the second earbud 204 to the electronic device 300 through, e.g., PLC communication, when a user input intending the pairing support operation is detected, with the first earbud 202 and/or the second earbud 204 mounted in the electronic device 300 and the cover 302 of the electronic device 300 closed. In an embodiment, the device information may be transferred from the first earbud 202 and/or the second earbud 204 to the electronic device 300 through, e.g., PLC communication, when the cover 302 of the electronic device 300 is closed with the first earbud 202 and/or the second earbud 204 mounted in the electronic device 300. In an embodiment, the device information may be transferred from the first earbud 202 and/or the second earbud 204 to the electronic device 300 after the user input is detected in operation 1120. Operation 1105 may be performed at other various times.

In operation 1110, the external electronic device 630 (e.g., the electronic device 101) may determine to perform a search operation for searching for an ambient Bluetooth device (or a Bluetooth device in proximity capable of performing Bluetooth communication) and periodically and/or repeatedly transmit an inquiry packet, e.g., an ID packet for search in operations 1115, 1130, and 1135.

In operation 1120, the electronic device 300 may detect a user input indicating the user's intent for pairing support with the first earbud 202 and the second earbud 204. In an embodiment, the user input may be detected through the input device (e.g., the input device 314 or the input device 550) of the electronic device 300. In an embodiment, in operation 1120, instead of directly detecting the user input, the electronic device 300 may receive, from the user terminal (e.g., the electronic device 101), a request for pairing with the first earbud 202 and the second earbud 204.

In operation 1125, the electronic device 300 may determine to perform an inquiry scan operation included in the pairing support operation of the first earbud 202 and the second earbud 204 according to embodiments described above and the user input. According to an embodiment, the electronic device 300 may determine to perform the inquiry scan operation upon meeting at least one additional condition, e.g., when the cover (e.g., the cover 302) of the electronic device 300 is open, when one or both the first earbud 202 and the second earbud 204 are mounted on a respective mounting unit (e.g., the first mounting unit 306 and/or the second mounting unit 308) of the electronic device 300, or when the battery status of the electronic device 300 is a designated battery level or more, along with the user input. Through the inquiry scan operation, the electronic device 300 may monitor reception of the ID packet transmitted from any Bluetooth device (e.g., the external electronic device 630).

In operation 1140, the electronic device 300 may receive the ID packet of operation 1135 among the ID packets transmitted from the external electronic device 630.

In operation 1145, the electronic device 300 may transmit the inquiry response packet, e.g., frequency hopping sequence (FHS) packet, responsive to reception of the ID packet, to the external electronic device 630. The FHS packet may include the device information, e.g., Bluetooth device address BT_Addr, obtained in operation 1105. The device information may include, at least, the Bluetooth device address of at least one of the first earbud 202 and the second earbud 204 and, optionally, may further include additional device information.

As an optional operation, in operation 1150, the electronic device 300 may transmit an EIR packet subsequent to the FHS packet. When the FHS packet of operation 1140 does not include device information about at least one of the first earbud 202 and the second earbud 204, the EIR packet may include the device information, e.g., the Bluetooth device address BT_Addr. The device information may include, at least, the Bluetooth device address of at least one of the first earbud 202 and the second earbud 204 and, optionally, may further include additional device information. In an embodiment, the FHS packet may include the Bluetooth device address of at least one of the first earbud 202 and the second earbud 204, and the EIR packet may include additional device information.

In operation 1155, the external electronic device 630 may display at least part of the device information obtained from at least one of the FHS packet or the EIR packet, e.g., the device name of the first earbud 202 and/or the second earbud 204. In operation 1160, the external electronic device 630 may establish a communication connection (e.g., Bluetooth legacy communication connection) with the first earbud 202 using the device information, automatically or in response to a user input requesting to pair with the first earbud 202 (or the first earbud 202 and the second earbud 204).

In an embodiment, the external electronic device 630 may send a request for direct connection to the first earbud 202 (or the first earbud 202 and the second earbud 204) using the Bluetooth address of the first earbud 202 (or the first earbud 202 and the second earbud 204). In an embodiment, when there is an already paired device (e.g., the electronic device 101), the first earbud 202 (or the first earbud 202 and the second earbud 204) may release the connection with the device and, in response to a connection request from the external electronic device 630, establish a Bluetooth connection with the external electronic device 630.

In an embodiment, the external electronic device 630 may transmit a connection request to the first earbud 202 using the device information and, when the first earbud 202 responds to the connection request, the external electronic device 630 may be connected with the first earbud 202. Although not shown, when the electronic device 630 uses a connection scheme, e.g., as shown in FIG. 9A, the electronic device 630 is connected with the second earbud 204 or paired with the first earbud 202 using the device information and then may be connected with the second earbud 204 using additional information received from the first earbud 202.

Figure 12:
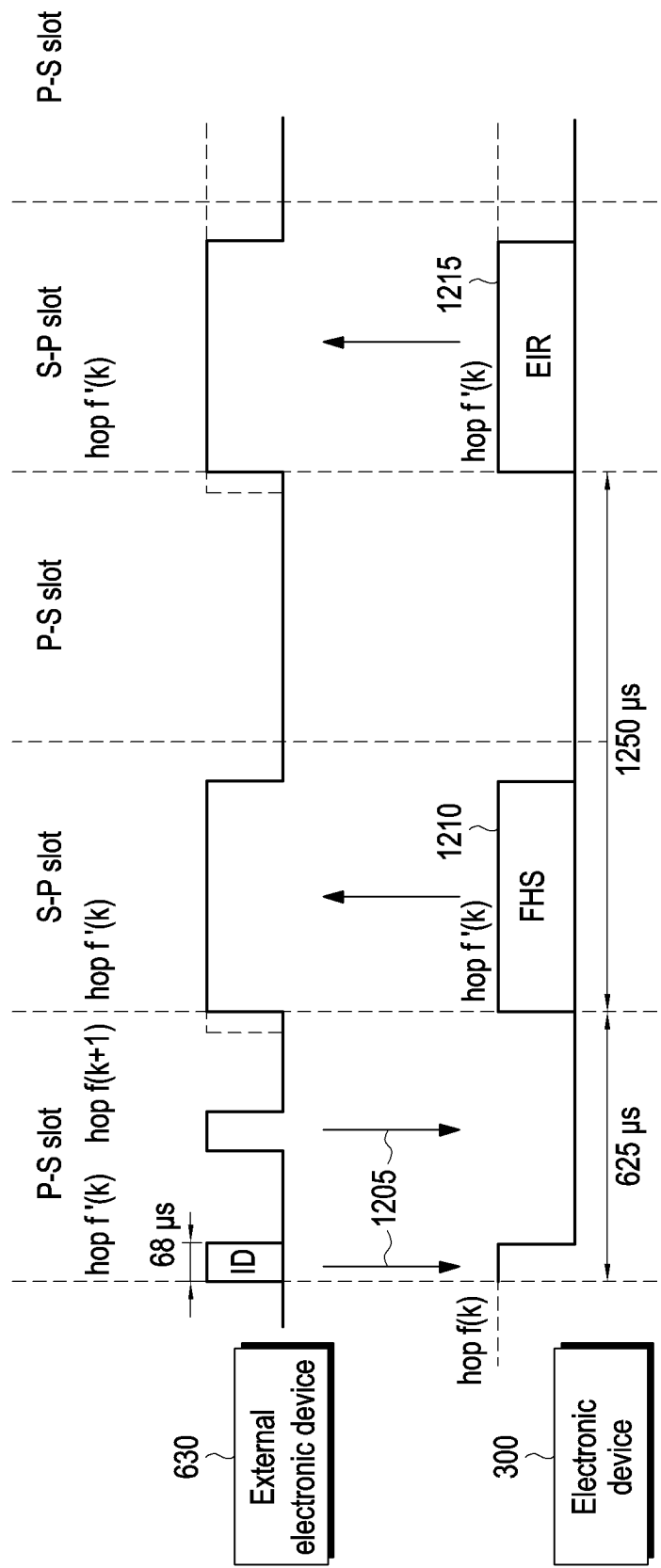
FIG. 12 is a timing diagram illustrating an inquiry scan operation of an electronic device according to one embodiment.

FIG. 12 is a timing diagram illustrating an inquiry scan operation of an electronic device 300 according to one embodiment.

Referring to FIG. 12, the external electronic device 630 (e.g., the electronic device 101) may search for Bluetooth devices positioned around, through the inquiry operation. The external electronic device 630 performing the inquiry operation may continuously transmit the inquiry packet, e.g., ID packet 1205, generated based on general inquiry access code (GIAC) during a given inquiry period (e.g., at least one primary-secondary slot). In an embodiment, each ID packet 1205 may be transmitted during at least one time period (e.g., the 68 μs period) in at least one primary-secondary slot (e.g., 625 μs period)

Upon receiving the ID packet 1205, the electronic device 300 performing the inquiry scan operation may, as responsive thereto, transmit an FHS packet 1210 through a channel determined according to a given hopping function hop f(k') in a given inquiry response period (e.g., at least one secondary-primary slot). In an embodiment, the external electronic device 630 may obtain the device information (e.g., the device information about the first earbud 202 and/or the second earbud 204) included in the FHS packet 120 through the FHS packet 1210. When the FHS packet 1210 indicates the presence of a next packet, the electronic device 300 may transmit the EIR packet 1215 through the same channel in the next secondary-primary slot. In an embodiment, when the FHS packet 1210 lacks the device information, the external electronic device 630 may obtain the device information (e.g., the device information about the first earbud 202 and/or the second earbud 204) from the EIR packet 1215. The external electronic device 630 may display, through a user experience (UX), information (e.g., device name) about the inquired Bluetooth device (e.g., the first earbud 202 and/or the second earbud 204) using various information included in the FHS packet 1210 and/or the EIR packet 1215.

Figure 13:
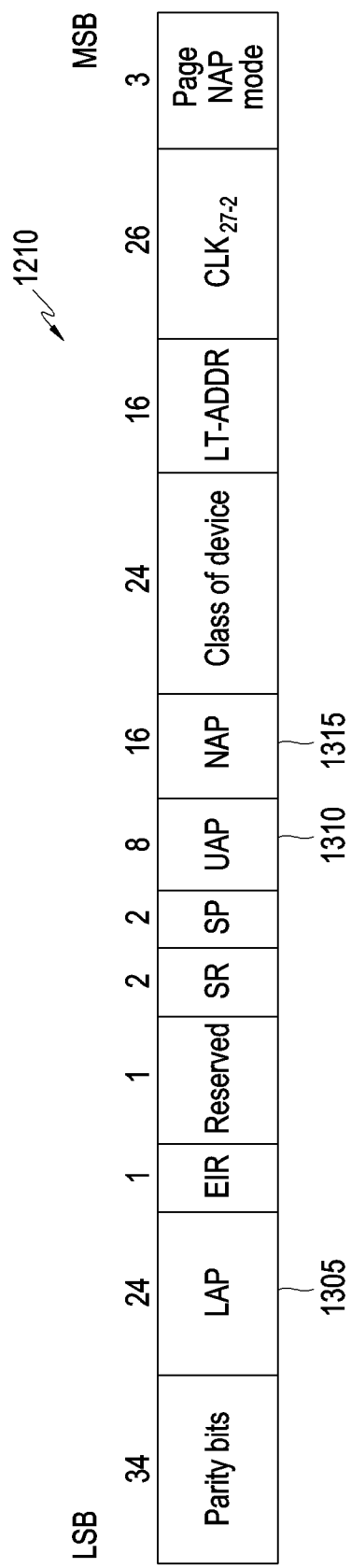
FIG. 13 illustrates a format of a frequency hopping sequence (FHS) packet according to one embodiment.

FIG. 13 illustrates the format of an FHS 1210 according to one embodiment.

Referring to FIG. 13, the FHS packet 1210 may include one or more of a parity bit, a lower address part (LAP) field 1305, an EIR bit, a scan repetition (SR) field, a scan period (SP) field, an upper address part (UAP) field 1310, a non-significant address part (NAP) field 1315, a device class field, a logical transport address (LT_ADDR) field, a clock field, and a page scan mode field. In an embodiment, at least one of the LAP field 1305, the UAP field 1310, or the NAP field 1315 may include the Bluetooth device address of the first earbud 202 and/or the second earbud 204, instead of the Bluetooth device address of the electronic device 300 transmitting the FHS packet 1210. In an embodiment, the FHS packet 1210 may include additional field(s) including device information (e.g., Bluetooth device address) about the first earbud 202 and/or the second earbud 204. Upon transmitting additional device information in addition to the FHS packet 1210, the electronic device 300 may set an EIR bit in the FHS packet 1210 and include and transmit additional device information in the EIR packet (e.g., the EIR packet 1215 of FIG. 14) in the next secondary-primary slot.

Figure 14:
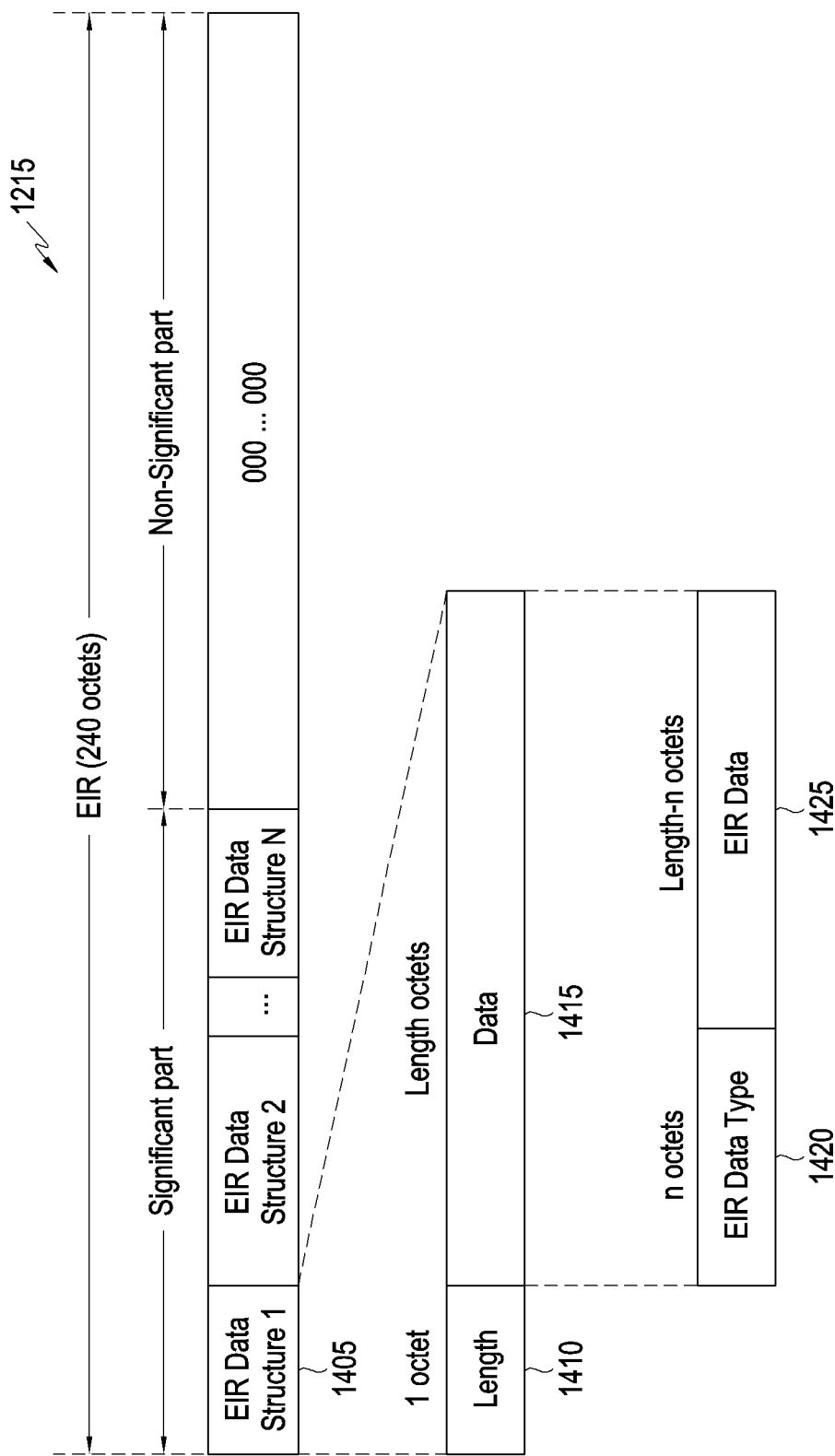
FIG. 14 illustrates a format of an extended inquiry response (EIR) packet according to one embodiment.

FIG. 14 illustrates the format of an EIR 1215 according to one embodiment.

Referring to FIG. 14, the EIR packet 1215 may include a significant part and a non-significant part. The significant part may include an EIR data structure 1405, and each EIR data structure 1405 may include a length field 1410 and a data field 1415. The data field 1415 may include an EIR data type field 1420 and an EIR data field 1425. In an embodiment, the EIR data field 1425 in the at least one EIR data structure 1405 may include device information about the first earbud 202 and/or the second earbud 204. In an embodiment, when the FHS packet 1210 includes the Bluetooth device address of the first earbud 202 and/or the second earbud 204, the EIR data field 1425 may include additional device information about the first earbud 202 and/or the second earbud 204. In an embodiment, the EIR data field 1425 may include entire device information including the Bluetooth device address of the first earbud 202 and/or the second earbud 204.

The external electronic device 630 performing the inquiry operation may receive the FHS packet 1210 and the EIR packet 1215 from the electronic device 300 and display, to the user, information (e.g., at least one of the Bluetooth device address, device name, or device type) about the first earbud 202 and/or the second earbud 204 obtained from the FHS packet 1210 and/or the EIR packet 1215, thereby leading the user to easier connection. In an embodiment, when performing a device search on the Bluetooth configuration of the external electronic device 630, the external electronic device 630 may display the searched first earbud 202 and/or the second earbud 204 to the user by a predetermined criterion.

Figure 15:
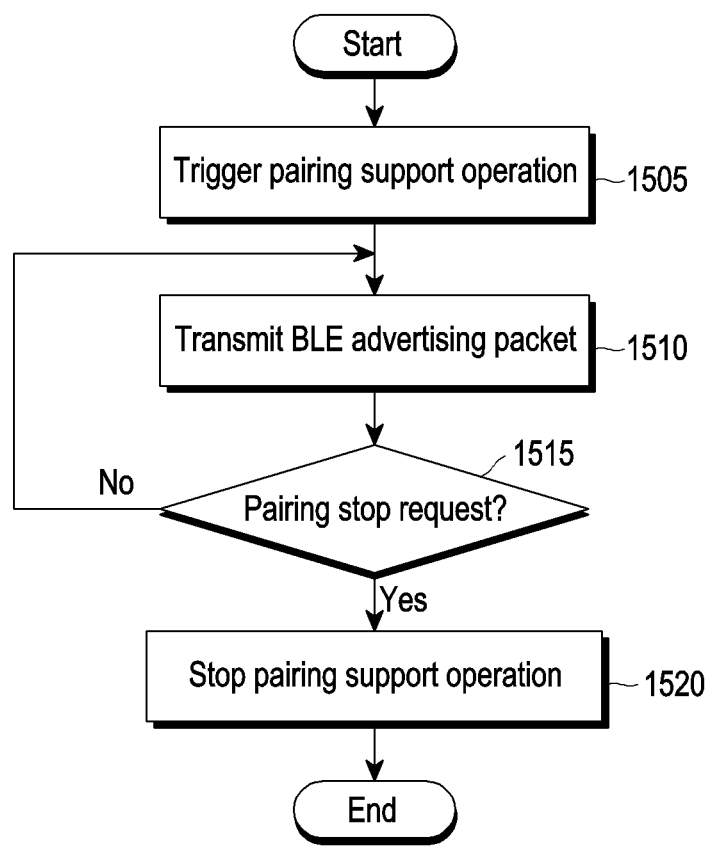
FIG. 15 is a flowchart illustrating another example of the procedure of performing a pairing support operation according to one embodiment.

FIG. 15 is a flowchart illustrating another example of the procedure of performing a pairing support operation according to one embodiment. According to embodiments, the operations shown in FIG. 15 are not limited to the shown order but may rather be performed in other various orders. According to embodiments, more or less operations than those of FIG. 15 may be performed. According to an embodiment, the operations illustrated in FIG. 15 may be implemented as instructions executed by a processor (e.g., the processor 510) included in the electronic device 300.

Referring to FIG. 15, in operation 1505, the electronic device 300 may detect that a pairing support operation is triggered. In an embodiment, e.g., in BLE communication, the pairing support operation may include operation 1510 described below. In an embodiment, the triggering of the pairing support operation may be determined by at least one of operation 710 or 715 of FIG. 7A. In an embodiment, the triggering of the pairing support operation may be determined by at least one of operations 725, 730, 735, or 750 of FIG. 7B. According to other embodiments, the pairing support operation may be triggered.

In operation 1510, the electronic device 300 may transmit an advertising packet for BLE communication for at least one of the first earbud 202 and the second earbud 204. In an embodiment, the electronic device 300 may perform operation 1510 by a previous setting. In an embodiment, the electronic device 300 may perform operation 1510 based on the device information, e.g., Bluetooth type and/or request information, received from at least one of the first earbud 202 and the second earbud 204. In an embodiment, when the first earbud 202 and the second earbud 204 are determined to use BLE communication based on the request information, the electronic device 300 may perform operation 1510. In an embodiment, when the first earbud 202 and the second earbud 204 are determined to use Bluetooth legacy communication based on the request information, the electronic device 300 may proceed to operation 1010 of FIG. 10.

In operation 1515, the electronic device 300 may determine whether to stop the pairing support operation. In an embodiment, the electronic device 300 may determine to stop the pairing support operation (e.g., transmission of the advertising packet) in response to detecting a transmission stop event. The transmission stop event includes one or a combination of, but is not limited to, detecting the designated battery status (e.g., less than a designated battery level) of the electronic device 300 and/or at least one of the first earbud 202 and the second earbud 204; when a designated time elapses after the pairing support operation is triggered in operation 1505; when a designated time elapses after transmission of the advertising packet is started in operation 1510; when a user input for canceling the pairing support operation (e.g., transmission of the advertising packet) is received; when a stop instruction is received from one or both of the first earbud 202 and the second earbud 204; and one or both of the first earbud 202 and the second earbud 204 are removed or disconnected from the electronic device 300. Unless the pairing support operation is determined to be stopped, the electronic device 300 may return to operation 1510, continuing transmission of the advertising packet.

When the pairing support operation is determined to be stopped, the electronic device 300 may proceed to operation 1520, stopping the pairing support operation (e.g., transmission of the advertising packet).

According to an embodiment, the electronic device 300 may identify the user's intent for pairing support of the first earbud 202 and the second earbud 204 and transmit the advertising packet to notify the external electronic device (e.g., the electronic device 101 or the electronic device 630) positioned around of the presence of the first earbud 202 and/or the second earbud 204. The electronic device 300 may transfer, to the external electronic device (e.g., the electronic device 101 or the electronic device 630), device information (including, e.g., the Bluetooth device address) about at least one of the first earbud 202 and the second earbud 204, through the advertising packet.

Figure 16:
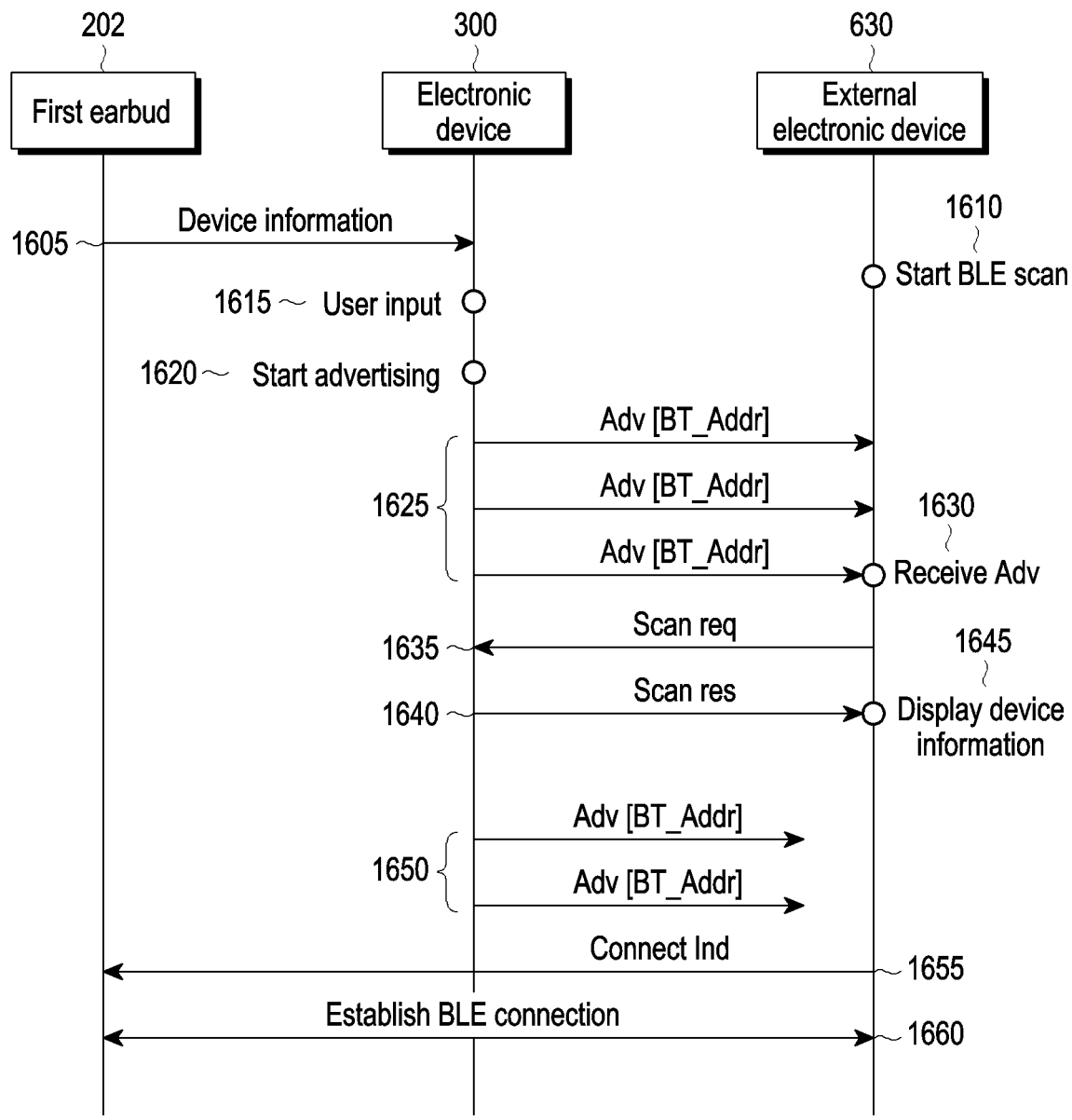
FIG. 16 is a sequence diagram illustrating a BLE advertising operation of an electronic device according to one embodiment.

FIG. 16 is a sequence diagram illustrating a BLE advertising operation of an electronic device 300 according to one embodiment.

Referring to FIG. 16, in operation 1605, at least one earbud (e.g., the first earbud 202) may transmit device information to the electronic device 300. In an embodiment, the device information may include device information about at least one of the first earbud 202 and the second earbud 204. In an embodiment, the device information may include the Bluetooth device address of one or both of the first earbud 202 and the second earbud 204. In an embodiment, the device information may be transferred from the first earbud 202 and/or the second earbud 204 to the electronic device 300 in response to detecting the user input in operation 1615. The device information may be transmitted at various times according to the above-described embodiment.

In operation 1610, the external electronic device 630 (e.g., the electronic device 101) may start an advertising scan operation for searching for an ambient Bluetooth device (or a Bluetooth device in proximity capable of performing Bluetooth communication).

In operation 1615, the electronic device 300 may detect a user input indicating the user's intent for pairing support with the first earbud 202 and the second earbud 204. In an embodiment, in operation 1615, instead of directly detecting the user input, the electronic device 300 may receive, from the user terminal (e.g., the electronic device 101), a request for pairing with the first earbud 202 and the second earbud 204.

In operation 1620, the electronic device 300 may determine to start the BLE advertising operation for searching for an ambient Bluetooth device (or a Bluetooth device in proximity capable of performing Bluetooth communication) according to embodiments described above and the user input and, in operation 1625, periodically transmit the advertising (Adv) packet with a time period. In an embodiment, the advertising packet may include advertising data. The advertising data may include device information, e.g., Bluetooth device address BT_Addr, about at least one of the first earbud 202 and the second earbud 204. The device information may further include additional device information.

In operation 1630, the external electronic device 630 may receive the advertising packet from the electronic device 300 and, perform a scan packet exchange in operations 1635 and 1640 based on the advertising packet received by the external electronic device 630. According to an embodiment, in operation 1635, the external electronic device 630 may transmit a scan request (Scan req.) corresponding to the advertising packet to the electronic device 300. The electronic device 300 may receive the scan request packet of operation 1635 and, in operation 1640, transmit a scan response packet corresponding to the scan request packet to the external electronic device 630. In an embodiment, when the advertising packet lacks the device information about the first earbud 202 and/or the second earbud 204, the scan response packet may include device information, e.g., Bluetooth device address BT_addr, about the first earbud 202 and/or the second earbud 204. In an embodiment, the advertising packet may include the device information about the first earbud 202 and/or the second earbud 204, and the scan response packet may include the additional device information.

In an embodiment, in operation 1635, the external electronic device 630 may transmit the scan request packet to the first earbud 202, instead of the electronic device 300, and receive a scan response packet corresponding to the scan request packet from the first earbud 202.

According to an embodiment, in operation 1650, the electronic device 300 may continuously and periodically transmit the advertising packet including the device information about the first earbud 202 and/or the second earbud 204. In an embodiment, in operation 1650, the transmission of the advertising packet may continue until the electronic device 300 determines to stop the pairing support operation. In an embodiment, the electronic device 300 may determine whether to stop the pairing support operation according to operation 1515 of FIG. 15.

In operation 1645, the external electronic device 630 may display at least part of the device information obtained through at least one of the advertising packet or the scan response packet, e.g., the device name of the first earbud 202 and/or the second earbud 204. In operation 1655, the external electronic device 630 may transmit a connection instruction (e.g., connect_ind) packet for initiating communication connection to the first earbud 202 using the device information, automatically or in response to a user input requesting to pair with the first earbud 202 (or the first earbud 202 and the second earbud 204). According to an embodiment, the external electronic device 630 may transmit the connection instruction (e.g., connect_ind) packet directly to the first earbud 202 without first transmitting the connection instruction (e.g., connect_ind) packet to the electronic device 300.

When the first earbud 202 responds to transmission of the connection instruction packet, the external electronic device 630 may establish a communication connection (e.g., BLE communication connection) with the first earbud 202 in operation 1660. According to an embodiment, the communication connection (e.g., BLE communication connection) between the external electronic device 630 and the first earbud 202 may be established in response to exchanging the connection instruction packet directly between the external electronic device 630 and the first earbud 200, without intervening input from the electronic device 300. In an embodiment, the electronic device 630 may connect to the second earbud 204 using the device information or pair with the first earbud 202 and then connect to the second earbud 204 using the additional information received from the first earbud 202.

An electronic device is provided which is capable of storing a pair of wireless earbuds. The electronic device transmits a pairing support signal including device information about the wireless earbuds in response to a user input to the electronic device instead of the wireless earbuds, and allows the wireless earbuds to pair with an external electronic device (in other words a different electronic device) without further action or input from the user, such as wearing or taking off the wireless earbuds. Accordingly, embodiments of the electronic device and method described herein improve the speed and convenience at which a user can pair an ear-wearable device such as earbuds, for example, with one or more electronic devices.

The effects obtainable in the present disclosure are not limited to the above-mentioned effects, other effects not mentioned will be clearly understood by those of ordinary skill in the art to which the present disclosure belongs from the following description.

According to an embodiment, an electronic device 300 may comprise an input device 550, a communication circuit 520, and at least one processor 510 operatively connected with the input device and the communication circuit. The at least one processor may be configured to receive, through the input device, a user input requesting pairing support for one or both of a first earbud 202 and a second earbud 204. The at least one processor may be configured to receive an inquiry packet through the communication circuit from an external electronic device by performing an inquiry scan operation in response to the user input. The at least one processor may be configured to transmit an inquiry response packet 620 including device information 605 about one or both of the first earbud and the second earbud to the external electronic device through the communication circuit in response to receiving the inquiry packet.

In an embodiment, the device information may include a Bluetooth device address corresponding to one or both of the first earbud and the second earbud.

In an embodiment, the inquiry response packet may include one or both of a frequency hopping sequence (FHS) packet and an extended inquiry response (EIR) packet.

In an embodiment, the FHS packet may include Bluetooth device address corresponding to one or both of the first earbud and the second earbud among the device information. The EIR packet may include one or a combination of a device name, a Bluetooth version, a device class (CoD), a battery level, clock information, a current connection status, page scan mode information, a transmit power level, a service class, at least one UUID, and manufacturer data among the device information.

In an embodiment, the at least one processor may be configured to receive the device information from one or both of the first earbud and the second earbud.

In an embodiment, the at least one processor may be configured to perform the inquiry scan operation in response to detecting an inquiry scan event. The inquiry scan event may include one or a combination of: when the user input is received with one or both of the first earbud and the second earbud mounted in the electronic device, when the user input is received with a cover, provided in a housing of the electronic device, open, when the user input is received with a battery status of the electronic device not less than a designated battery level, and when a request signal indicating pairing support for one or both of the first earbud and the second earbud is received from an external electronic device through the communication circuit.

In an embodiment, the at least one processor may be configured to stop the inquiry scan operation in response to detecting a stop event. The stop event may include one or a combination of: when a designated time elapses after the inquiry scan operation starts, when a user input requesting to stop the inquiry scan operation is received, when a stop instruction is received from the at least one of the first earbud or the second earbud, when one or both of the first earbud and the second earbud are removed or disconnected from the electronic device, and when a battery status of at least one of the electronic device, the first earbud, or the second earbud is less than a designated battery level.

According to an embodiment, a method for operating an electronic device 300 may include receiving (1005; 710 and 725) a user input requesting pairing support for one or both of a first earbud 202 and a second earbud 204. The method may include receiving (1015) an inquiry packet from an external electronic device 630 by performing an inquiry scan operation in response to the user input. The method may include transmitting (1020) an inquiry response packet 620 including device information 605 about one or both of the first earbud and the second earbud to the external electronic device in response to receiving the inquiry packet.

In an embodiment, the device information may include a Bluetooth device address corresponding to one or both of the first earbud and the second earbud.

In an embodiment, the inquiry response packet may include one or both of a frequency hopping sequence (FHS) packet and an extended inquiry response (EIR) packet.

In an embodiment, the FHS packet may include a Bluetooth device address of one or both of the first earbud and the second earbud among the device information. The EIR packet may include one or a combination of a device name, a Bluetooth version, a device class (CoD), a battery level, clock information, a current connection status, page scan mode information, a transmit power level, a service class, at least one UUID, and manufacturer data among the device information.

In an embodiment, the method may further comprise receiving (705 and 740) the device information from one or both of the first earbud and the second earbud.

In an embodiment, the inquiry scan operation may be performed in response to detecting an inquiry scan event. The inquiry scan event may include one or a combination of: when the user input is received with one or both of the first earbud and the second earbud mounted in the electronic device, when the user input is received with a cover, provided in a housing of the electronic device, open, when the user input is received with a battery status of the electronic device not less than a designated battery level, and when a signal indicating pairing support for one or both of the first earbud and the second earbud is received from an external electronic device.

In an embodiment, the method may include stopping (1030) the inquiry scan operation in response to detecting a stop event. The stop event may include one or a combination of: when a designated time elapses after the inquiry scan operation starts, when a user input requesting to stop the inquiry scan operation is received, when a stop instruction is received from the at least one of the first earbud or the second earbud, when one or both of the first earbud and the second earbud are removed from the electronic device, and when a battery status of at least one of the electronic device, the first earbud, or the second earbud is less than a designated battery level.

According to an embodiment, an electronic device 300 may comprise an input device 550, a communication circuit 520, and at least one processor 510 operatively connected with the input device and the communication circuit. The at least one processor may be configured to receive, through the input device, a user input for pairing support for one or both of a first earbud and a second earbud. The at least one processor may be configured to transmit, through the communication circuit, a Bluetooth low energy (BLE) advertising packet 620 including device information 605 about one or both of the first earbud and the second earbud in response to the user input.

In an embodiment, the device information may include a Bluetooth device address corresponding to one or both of the first earbud and the second earbud.

In an embodiment, the at least one processor may be configured to receive the device information from one or both of the first earbud and the second earbud.

In an embodiment, the at least one processor may be configured to transmit the BLE advertising packet in response to detecting a BLE transmit event. The BLE transmit event may include one or a combination of: when the user input is received with one or both of the first earbud and the second earbud mounted in the electronic device, when the user input is received with a cover, provided in a housing of the electronic device, open, when the user input is received with a battery status of the electronic device not less than a designated battery level, and when a request signal indicating pairing support corresponding to one or both of the first earbud and the second earbud is received from an external electronic device through the communication circuit.

In an embodiment, the at least one processor may be configured to stop the transmission of the BLE advertising packet in response to detecting a transmission stop event. The transmission stop event may include one or a combination of: when a designated time elapses after the transmission of the BLE advertising packet starts, when a user input requesting to stop the transmission of the BLE advertising packet is received, when a stop instruction is received from the at least one of the first earbud or the second earbud, when one or both of the first earbud and the second earbud are removed or disconnected from the electronic device, and when a battery status of at least one of the electronic device, the first earbud, or the second earbud is less than a designated battery level.

According to an embodiment, a method for operating an electronic device may include receiving (1505; 710 and 725) a user input requesting pairing support for one or both of a first earbud and a second earbud. The method may include transmitting (1510) a Bluetooth low energy (BLE) advertising packet 620 including device information 605 about one or both of the first earbud and the second earbud in response to the user input.

In an embodiment, the device information may include a Bluetooth device address corresponding to one or both of the first earbud and the second earbud.

In an embodiment, the method may further comprise receiving (705 and 740) the device information from one or both of the first earbud and the second earbud.

In an embodiment, transmitting the BLE advertising packet may be performed in response to detecting a BLE transmit event. The BLE transmit event may include one or a combination of when the user input is received with one or both of the first earbud and the second earbud mounted in the electronic device, when the user input is received with a cover, provided in a housing of the electronic device, open, when the user input is received with a battery status of the electronic device not less than a designated battery level, and when a request signal indicating pairing support corresponding to one or both of the first earbud and the second earbud is received from an external electronic device.

In an embodiment, the method may include stopping (1520) the transmission of the BLE advertising packet in response to detecting a transmission stop event. The transmission stop event may include one or a combination of, when a designated time elapses after the transmission of the BLE advertising packet starts, when a user input requesting to stop the transmission of the BLE advertising packet is received, when a stop instruction is received from the at least one of the first earbud or the second earbud, when one or both of the first earbud and the second earbud are removed or disconnected from the electronic device, and when a battery status of at least one of the electronic device, the first earbud, or the second earbud is less than a designated battery level.

According to an embodiment, an electronic device 300 may comprise an input device 550 which receives a request to support pairing of an ear-wearable device, a communication circuit 520 which wirelessly transmits and receives data, and a processor 510 operatively connected with the input device and the communication circuit. The processor may be configured to initiate a Bluetooth low energy (BLE) advertising operation in response to receiving the request and to periodically transmit an advertising packet with a time period in response to initiating the BLE advertising operation. The processor may be configured to perform a scan packet exchange with an external electronic device to deliver device information corresponding to the ear-wearable device to the external electronic device, and establish a BLE connection with the external electronic device based at least in part on the device information.

In an embodiment, the ear-wearable device may include one or both of a first earbud and a second earbud.

In an embodiment, the first earbud may receive a connection instruction packet from the external electronic device and establish a BLE connection with the external electronic device based at least in part on the connection instruction packet.

In an embodiment, the first earbud may transmit additional device information to the external electronic device in response to establishing the BLE connection. The external electronic device may pair with the second earbud based at least in part on the additional device information.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
an input device;
communication circuitry;
at least one processor operatively connected with the input device and the communication circuitry; and
memory storing instructions, wherein the instructions, when executed by the at least one processor individually or collectively, cause the electronic device to:
receive, through the communication circuitry, device information of one or both of a first earbud and a second earbud, wherein the electronic device is a charging cradle having storage spaces for the first earbud and the second earbud,
receive, through the input device, a user input requesting pairing support for the first earbud and second earbud, while at least one of the first earbud or the second earbud is mounted in the electronic device and a cover of the electronic device is an open state,
receive an inquiry packet through the communication circuitry from an external electronic device by performing an inquiry scan operation in response to the user input, and
transmit an inquiry response packet including device information about one or both of the first earbud and the second earbud to the external electronic device through the communication circuitry in response to receiving the inquiry packet.

2. The electronic device of claim 1, wherein the device information includes a Bluetooth device address corresponding to at least one of the first earbud or the second earbud, and
wherein the instructions, when executed by the at least one processor individually or collectively, cause the electronic device to receive the device information from at least one of the first earbud or the second earbud.

3. The electronic device of claim 1, wherein the inquiry response packet includes at least one of a frequency hopping sequence (FHS) packet or an extended inquiry response (EIR) packet,
wherein the FHS packet includes a Bluetooth device address corresponding to at least one of the first earbud or the second earbud among the device information, and
wherein the EIR packet includes one or a combination of a device name, a Bluetooth version, a device class (COD), a battery level, clock information, a current connection status, page scan mode information, a transmit power level, a service class, at least one universally unique identifier (UUID), and manufacturer data among the device information.

4. The electronic device of claim 1, wherein the instructions, when executed by the at least one processor individually or collectively, cause the electronic device to perform the inquiry scan operation in response to detecting an inquiry scan event, the inquiry scan event comprising one or a combination of:
when the user input is received with a battery status of the electronic device not less than a designated battery level; and
when a request signal indicating pairing support for at least one of the first earbud or the second earbud is received from an external electronic device through the communication circuitry.

5. A method for operating an electronic device, the method comprising:
obtaining device information of one or both of a first earbud and a second earbud, wherein the electronic device is a charging cradle having storage spaces for the first earbud and the second earbud;
receiving a user input requesting pairing support for the first earbud and the second earbud, while at least one of the first earbud or the second earbud is mounted in the electronic device and a cover of the electronic device is an open state;
receiving an inquiry packet from an external electronic device by performing an inquiry scan operation in response to the user input; and
transmitting an inquiry response packet including device information about one or both of the first earbud and the second earbud to the external electronic device in response to receiving the inquiry packet.

6. The method of claim 5, wherein the device information includes a Bluetooth device address corresponding to at least one of the first earbud or the second earbud, and
wherein the device information is received from at least one of the first earbud or the second earbud.

7. The method of claim 5, wherein the inquiry response packet includes at least one of a frequency hopping sequence (FHS) packet or an extended inquiry response (EIR) packet,
wherein the FHS packet includes a Bluetooth device address of at least one of the first earbud or the second earbud among the device information, and
wherein the EIR packet includes one or a combination of a device name, a Bluetooth version, a device class (COD), a battery level, clock information, a current connection status, page scan mode information, a transmit power level, a service class, at least one UUID, and manufacturer data among the device information.

8. The method of claim 5, wherein the inquiry scan operation is performed in response to detecting an inquiry scan event, the inquiry scan event comprising one or a combination of:

when the user input is received with a battery status of the electronic device not less than a designated battery level; and when a signal indicating pairing support for at least one of the first earbud or the second earbud is received from an external electronic device.

9. The method of claim 5, further comprising stopping the inquiry scan operation in response to detecting a stop event, the stop event comprising one or a combination of:

when a designated time elapses after the inquiry scan operation starts;

when a user input requesting to stop the inquiry scan operation is received;

when a stop instruction is received from at least one of the first earbud or the second earbud;

when at least one of the first earbud or the second earbud are removed or disconnected from the electronic device; and when a battery status of at least one of the electronic device, the first earbud or the second earbud is less than a designated battery level.

10. The electronic device of claim 1, wherein the instructions, when executed by the at least one processor individually or collectively, cause the electronic device to:

receive, through the input device, a first user input requesting pairing support for one or both of the first earbud and the second earbud, while at least one of the first earbud or the second earbud is mounted in the electronic device and the cover of the electronic device is an open state, and transmit, through the communication circuitry, a Bluetooth low energy (BLE) advertising packet including the device information about one or both of the first earbud and the second earbud in response to the first user input.

11. The electronic device of claim 10, wherein the device information includes a Bluetooth device address corresponding to at least one of the first earbud or the second earbud, and wherein the at least one processor is configured to receive the device information from at least one of the first earbud or the second earbud.

12. The electronic device of claim 10, wherein the instructions, when executed by the at least one processor individually or collectively, cause the electronic device to transmit the BLE advertising packet in response to detecting a BLE transmit event, the BLE transmit event comprising one or a combination of:

when the first user input is received with a battery status of the electronic device not less than a designated battery level; and when a request signal indicating pairing support corresponding to at least one of the first earbud or the second earbud is received from an external electronic device through the communication circuitry.

13. The method of claim 5, further comprising:

receiving a first user input requesting pairing support for one or both of the first earbud and the second earbud, while at least one of the first earbud or the second earbud is mounted in the electronic device and the cover of the electronic device is an open state; and transmitting a Bluetooth low energy (BLE) advertising packet including the device information about one or both of the first earbud and the second earbud in response to the first user input.

14. The method of claim 13, wherein the device information includes a Bluetooth device address corresponding to at least one of the first earbud or the second earbud, and wherein the device information is received from at least one of the first earbud or the second earbud.

15. The method of claim 13, wherein transmitting the BLE advertising packet is performed in response to detecting a BLE transmit event, the BLE transmit event comprising one or a combination of:

when the first user input is received with a battery status of the electronic device not less than a designated battery level; and when a request signal indicating pairing support corresponding to at least one of the first earbud or the second earbud is received from an external electronic device.

16. The method of claim 13, further comprising stopping the transmission of the BLE advertising packet in response to detecting a transmission stop event, the transmission stop event comprising one or a combination of:

when a designated time elapses after the transmission of the BLE advertising packet starts;

when a user input requesting to stop the transmission of the BLE advertising packet is received;

when a stop instruction is received from at least one of the first earbud or the second earbud;

when one or both of the first earbud and the second earbud are removed or disconnected from the electronic device; and when a battery status of at least one of the electronic device, the first earbud or the second earbud is less than a designated battery level.

* * * * *